United States Patent [19]
Yamaguchi

[11] Patent Number: 5,875,000
[45] Date of Patent: Feb. 23, 1999

[54] MULTI-PICTURE TELEVISION RECEIVER

[75] Inventor: Koichi Yamaguchi, Saitama-ken, Japan

[73] Assignee: Kabushiki Kaisha Toshiba, Kawasaki, Japan

[21] Appl. No.: 568,574

[22] Filed: Dec. 7, 1995

[30]     Foreign Application Priority Data

Dec. 7, 1994 [JP] Japan .................................. 6-303884

[51] Int. Cl.⁶ .................................................. H09N 5/46
[52] U.S. Cl. ......................... 348/563; 348/564; 348/565; 348/568
[58] Field of Search ................................. 348/563, 564, 348/565, 568, 588; H04N 5/46

[56]            References Cited

U.S. PATENT DOCUMENTS

| | | | |
|---|---|---|---|
| 5,249,049 | 9/1993 | Kranawater et al. | 358/141 |
| 5,345,270 | 9/1994 | Saeger et al. | 348/435 |
| 5,363,143 | 11/1994 | Duffield | 348/564 |
| 5,434,625 | 7/1995 | Willis | 348/564 |
| 5,500,683 | 3/1996 | Yatomi et al. | 348/563 |
| 5,504,535 | 4/1996 | Abe | 348/565 |

FOREIGN PATENT DOCUMENTS

| | | | |
|---|---|---|---|
| 5-91484 | 4/1993 | Japan . | |
| 6-86188 | 3/1994 | Japan | H04N 5/46 |

*Primary Examiner*—Mark R. Powell
*Assistant Examiner*—Vivck Srivastava
*Attorney, Agent, or Firm*—Cushman Darby & Cushman, IP Group of Pillsbury Madison & Sutro LLP

[57]            ABSTRACT

A multi-picture television receiver simultaneously displays side-by-side pictures by first and second video signals of first and second video systems, respectively. The video systems can be PAL, SECAM or NTSC. Discriminating circuitry discriminates the system of the first and second video signals. Controlling circuitry controls a sub-picture video processing circuitry based on the results of the discriminating circuitry, so that, when the number of scanning lines of tie second video signal differs from the number of scanning lines of the first video signal, the main and/or the sub-picture are controlled.

17 Claims, 12 Drawing Sheets

MULTI-PICTURE TELEVISION RECEIVER

BACKGROUND OF THE INVENTION

1. Field of the Invention

This invention relates to a television receiver provided with a sub-picture function and more particularly to a multi-picture television receiver wherein videos can be displayed by respectively different television standard systems (such as the NTSC, PAL, and SECAM) in a television receiver wherein two pictures of the same size are arranged so as to be able to be displayed.

2. Description of the Related Art

In a television receiver having a function of displaying a main picture and a sub-picture which is separate from the main picture and is a second picture, a television receiver having a function of displaying respectively in substantially the same size a main picture on one side and a sub-picture on the other side by dividing a picture into two parts has been already publicized. Hereafter, for the sake of convenience, the main picture shall refer to a picture which is displayed on the left side of the picture and is on the side out of which a synchronized signal which will be a reference in case the entire picture (both main and sub-pictures) is deflected or the like is taken.

FIG. 17 is a block diagram showing a formation example of a conventional television receiver in which two pictures of the same size are arranged and one of the pictures can be displayed as a main picture and the other can be displayed as a sub-picture.

In FIG. 17, a video signal for a sub-picture is output to a main picture/sub-picture superimposing part 12 through a video/chroma/deflecting processing part (called a V/C/D part hereinafter) 1, A/D converting part 2, data re-arranging part (for writing into a memory) 3, video memory 4, data re-arranging part (for reading out of the memory) 5 and D/A converting part 6. A writing timing generating part 7 adjusting the timing of writing data into the video memory 4 and a reading timing generating part 8 adjusting the timing of reading data, out of the video memory 4 are controlled by a controlling part 9 to adjust said writing timing and reading timing on the basis of a controlling signal from the controlling part 9.

On the other hand, a video signal for a main picture is output to the main picture/sub-picture superimposing part 12 through a V/C/D part 10, A/D converting part 62, video memory 63 and D/A converting part 64. The video memory 63 is controlled in the data writing and reading timing by a memory controlling part 61.

The superimposed video signal is reproduced to be a tri-color signal in a video processing part 13 and is fed to a CRT 14.

The operation of the television receiver wherein two pictures of the same size are arranged so as to be able to be displayed, one of the pictures is made a main picture and the other is made a sub-picture as formed as in the above shall be explained in the following.

The video signal for the sub-picture is video/chroma processed in the V/C/D part 1, is separated and converted to a luminance signal and color difference signal from a composite video signal and is fed to the A/D converting part 2. The V/C/D part 1 separates a synchronizing signal from the composite video signal to produce a horizontal synchronizing signal (WHD) and vertical synchronizing signal (WVD) and feeds them to the writing timing generating part 7.

The writing timing generating part 7 generates an A/D converting timing signal 15, data re-arranging timing signal 16 and data writing timing signal 17 on the basis of the WHD and WVD from the V/C/D part 1 and outputs them respectively to the A/D converting part 2, data re-arranging part (for writing into the memory) 3 and video memory 4.

The A/D converting part 2 converts the video signal for said sub-picture to a digital signal on the basis of the A/D converting timing signal 15 and outputs it to the data re-arranging part (for writing into the memory) 3. The data re-arranging part (for writing into the memory) 3 re-arranges said digital converted sub-picture video signal data rows in the order adapted to writing into the memory on the basis of the data re-arranging timing signal 16 and outputs them to the video memory 4. The video memory 4 writes in the memory the re-arranged sub-picture video signal data rows on the basis of the data writing timing signal 17.

On the other hand, the main picture video signal is video/chroma processed in the V/C/D part 10 so as to be separated and converted to a luminance signal and color difference signal from a composite video signal. The V/C/D part 10 separates a synchronizing signal from the composite video signal to produce a horizontal synchronizing signal (RHD) and vertical synchronizing signal (RVD) and feeds them to the reading timing generating part 8 and memory controlling part 61.

The reading timing generating part 8 generates a data reading timing signal 18, data re-arranging timing signal 19, D/A converting timing signal 20 and main picture/sub-picture switching controlling signal (YS) 11 on the basis of the RHD and RVD from the V/C/D part 10 and outputs them respectively to the video memory 4, data re-arranging part (for reading out of the memory) 5, D/A converting part 6 and main picture/sub-picture superimposing part 12. The sub-picture video data read out of the video memory 4 are read out at a speed about twice as high as the speed in writing and with a delay time (H/2) ½ time as long as a horizontal scanning period (1H) so that the sub-picture video may be displayed on half the right side on the CRT. This is because, if it is assumed that the sub-picture video data are written in real-time, in case the sub-picture video data are read out for a time n times (n is a positive real number) as long as the writing time, the sub-picture video will be compressed (or extended) to be 1/n time as large.

In the same manner, the memory controlling part 61 controls the video memory 63 to write and read video data on the basis of the horizontal synchronizing signal (RHD) and vertical synchronizing signal (RVD) from the V/C/D part 10. In case the main picture video data are read out of the video memory 63, the same as in the case of the sub-picture video data, the main picture video data will be read out at a speed about twice as high as the speed in writing so that the main picture may be displayed on half the left side on the CRT.

On the other hand, the re-arranged sub-picture video signal data rows written on the video memory 4 are read out of the video memory 4 on the basis of the data reading timing signal 18 generated by the reading timing generating part 8 and are output to the data re-arranging part (for reading out the memory) 5. The data output from the re-arranging part (for reading out the memory) 5 is re-arranged (returned) to the sub-picture video signal data rows as of before the data are re-arranged by the data re-arranging part (for writing into the memory) 3 on the basis of the data re-arranging timing signal 19 and is output to the D/A converting part 6. The D/A converting part 6 converts (returns) said sub-picture digital video signal to an analogue signal on the basis of the D/A converting timing signal 20 and outputs it to the main picture/sub-picture superimposing part 12.

The main picture/sub-picture superimposing part 12 superimposes said sub-picture video signal converted to an analog signal and said main picture video signal on each other. A superimposed video signal is reproduced to be a tri-color signal through the video processing part 13 and is displayed on the picture of the CRT 14.

The television standard systems adopted today in various countries in the world are largely divided into three kinds of an NTSC system adopted mostly in Japan and America, a PAL system adopted mostly in West Europe and an SECAM system adopted mostly in the old Soviet Union, France and East Europe. Among them, the PAL system and SECAM system are common with each other in respect that the number of scanning lines per frame is 625, whereas in the NTSC system adopted in Japan, USA and so on the number of said scanning lines 525 per frame and is different from the PAL system and SECAM system.

Therefore, in the conventional television receiver having a function of displaying in substantially the same size a main picture on one side of a picture divided into two parts and a sub-picture on the other side, a video of a number of scanning lines different from the number of scanning lines on the main picture has not been able to be displayed on the sub-picture simultaneously with the main picture.

SUMMARY OF THE INVENTION

An object of the present invention is to provide a multi-picture television receiver wherein a video different from the number of scanning lines of a main picture can be displayed as a sub-picture simultaneously with the main picture in a television receiver having a function of displaying in substantially the same size a main picture on one side of a picture divided into two parts on the left and right and a sub-picture on the other side.

The multi-picture television receiver according to the first embodiment of the present invention is a multi-picture television receiver wherein a main picture by the first video signal and a sub-picture by the second video signal can be displayed simultaneously on the left and right, characterized by comprising:

a main picture video processing means whereby said first video signal can be input, can be compressed in a horizontal direction and can be output;

a sub-picture video processing means including a first means compressing said second video signal in a horizontal direction and a second means whereby said second video signal can have the number of scanning lines reduced and can be compressed in a vertical direction;

a first discriminating means discriminating the system of said first video signal;

a second discriminating means discriminating the system of said second video signal;

a controlling means controlling said sub-picture video processing means on the basis of the discriminating results of said first and second discriminating means so that, in case the number of scanning lines of said second video signal is larger than the number of scanning lines of said first video signal, said second video signal will be compressed in a vertical direction and, in case the number of scanning lines of said second video signal and the number of scanning lines of said first video signal are equal to each other, said second video signal will not be compressed in the vertical direction and will be output; and a superimposing means whereby the output signal of said main picture video processing means and the output signal of said sub-picture video processing means are input and the respective output signals are selected, switched and fed to the displaying means.

According to the first embodiment of the present invention, as the means of compressing said second video signal in the vertical direction on the basis of the discriminating results of the first and second discriminating means in case the number of scanning lines of the second video signal is larger than the number of scanning lines of the first video signal is provided, two video signals different in the system of the video signal can be displayed simultaneously on the left and right on one CRT.

The multi-picture television receiver according to the second embodiment of the present invention is a multi-picture television receiver wherein a main picture by the first video signal and a sub-picture by the second video signal can be displayed simultaneously on the left and right, characterized by comprising:

a main picture video processing means whereby said first video signal can be input, compressed in a horizontal direction and can be output;

a sub-picture video processing means including a first means compressing said second video signal in a horizontal direction and a second means whereby the video part in at least one of an upper part and lower part of said second video signal can be blanked, can have the number of scanning lines reduced and can be output;

a first discriminating means discriminating the system of said first video signal;

a second discriminating means discriminating the system of said second video signal;

a controlling means controlling said sub-picture video processing means on the basis of the discriminating results of said first and second discriminating means so that, in case the number of scanning lines of said second video signal is larger than the number of scanning lines of said first video signal, said second video signal will be blanked, will have the scanning lines reduced and will be output and, in case the number of scanning lines of said second video signal and the number of scanning lines of said first video signal are equal to each other, said second video signal will not be blanked, will not have the scanning lines reduced and will be output; and a superimposing means whereby the output signal of said main picture video processing means and the output signal of said sub-picture video processing means are input and the respective output signals are selected, switched and fed to a displaying means.

According to the second embodiment of the present invention, as a means of blanking said second video signal and reducing the scanning lines on the basis of the discriminating results of the first and second discriminating means in case the number of scanning lines of the second video signal is larger than the number of scanning lines of the first video signal is provided, two video signals different in the system of the video signal can be displayed simultaneously on the left and right on one CRT.

The multi-picture television receiver according to the third embodiment of the present invention is a multi-picture television receiver wherein a main picture by a first video signal and a sub-picture by a second video signal can be displayed simultaneously on the left and right, characterized by comprising:

a main picture video processing means whereby said first video signal can be input, can be compressed in a horizontal direction and can be output;

a sub-picture video processing means whereby said second video signal can be converted to a digital signal, the digital signal can be written into a provided memory and the signal written into said memory can be read but, can be converted to an analogue signal and can be output;

a first discriminating means discriminating the system of said first video signal;

a second discriminating means discriminating the system of said second video signal;

a controlling means controlling said sub-picture video processing means on the basis of the discriminating results of said first and second discriminating means so that, in case the number of scanning lines of said second video signal is larger than the number of scanning lines of said first video signal, others than the video signal part corresponding to at least one of the upper part and lower part of the picture of the second video signal written into said memory will be read out and the number of scanning lines of the sub-picture will be controlled to be equal to the number of scanning lines of the main picture and, in case the number of scanning lines of said second video signal is equal to the number of scanning lines of said first video signal, all the video signal part of the second video signal written into said memory will be controlled to be read out; and a superimposing means whereby the output signal of said main picture video processing means and the output signal of said sub-picture video processing means are input and the respective output signals are selected, switched and fed to a displaying means.

According to the third embodiment of the present invention, as a controlling means on the basis of the discriminating results of the first and second discriminating means so that, in case the number of scanning lines of the second video signal is larger than the number of scanning lines of the first video signal, others than the video signal part corresponding to at least one of the upper part and lower part of the picture of the video signal written into the memory will be read out and the number of scanning lines of the sub-picture will be controlled to be equal to the number of scanning lines of the main picture is provided, two video signals different in the system of the video signal can be displayed simultaneously on the left and right on one CRT.

The multi-picture television receiver according to the fourth embodiment of the present invention is a multi-picture television receiver wherein a main picture by a first video signal and a sub-picture by a second video signal can be displayed simultaneously on the left and right, characterized by comprising:

a main picture video processing means whereby said first video signal can be input, can be compressed in a horizontal direction and can be output;

a sub-picture video processing means including a first means compressing said second video signal in a horizontal direction and a second means whereby said second video signal can have another video signal added to increase the number of scanning lines and can be output;

a first discriminating means discriminating the system of said first video signal;

a second discriminating means discriminating the system of said second video signal;

a controlling means controlling said sub-picture video processing means on the basis of the discriminating results of said first and second discriminating means so that, in case the number of scanning lines of said second video signal is smaller than the number of scanning lines of said first video signal, said second video signal will have another video information added to increase the number of scanning lines and will be output and, in case the number of scanning lines of said second video signal is equal to the number of scanning lines of said first video signal, said second video signal will not have said another video information added and will be output; and a superimposing means whereby the output signal of said main picture video processing means and the output signal of said sub-picture video processing means are input and the respective output signals are selected, switched and fed to a displaying means.

According to the fourth embodiment of the present invention, on the basis of the discriminating results of the first and second discriminating means, in case the number of scanning lines of the second video signal is smaller than the number of scanning lines of the first video signal, said second video signal will have another video information added to increase the number of scanning lines and will be output. Therefore, two video signals different in the system of the video signal can be displayed simultaneously on the left and right on one CRT and the eyesore black band part can be made inconspicuous by said added video information.

The multi-picture television receiver according to the fifth embodiment of the present invention is a multi-picture television receiver wherein a main picture by a first video signal and a sub-picture by a second video signal can be displayed simultaneously on the left and right, characterized by comprising:

a main picture video processing means whereby said first video signal can be input, can be compressed in a horizontal direction and can be output;

a sub-picture video processing means including a first means compressing said second video signal in a horizontal direction and a second means whereby said second video signal can have another video information added to increase the number of scanning lines and can be output;

a means generating text information;

a first discriminating means discriminating the system of said first video signal;

a second discriminating means discriminating the system of said second video signal;

a controlling means controlling said sub-picture video processing means on the basis of the discriminating results of said first and second discriminating means so that, in case the number of scanning lines of said second video signal is smaller than the number of scanning lines of said first video signal, said second video signal will have said text information added to increase the number of scanning lines and will be output and, in case the number of scanning lines of said second video signal is equal to the number of scanning lines of said first video signal, said second video signal will not have said text information added and will be output; and a superimposing means whereby the output signal of said main picture video processing means and the output signal of said sub-picture video processing means are input and the respective output signals are selected, switched and fed to a displaying means.

According to the fifth embodiment of the present invention, on the basis of the discriminating results of the first and second discriminating means, in case the number of scanning lines of the second video signal is smaller than the number of scanning lines of the first video signal, said second video signal will have text information added to increase the number of scanning lines and will be output and therefore two video signals different in the system of the video signal can be displayed simultaneously on the left and right on one CRT and the added text information can be viewed simultaneously with the first and second video signals.

DETAILED DESCRIPTION OF THE PREFERRED EMBODIMENTS

The embodiments shall be explained with reference to the drawings.

Figure 1:
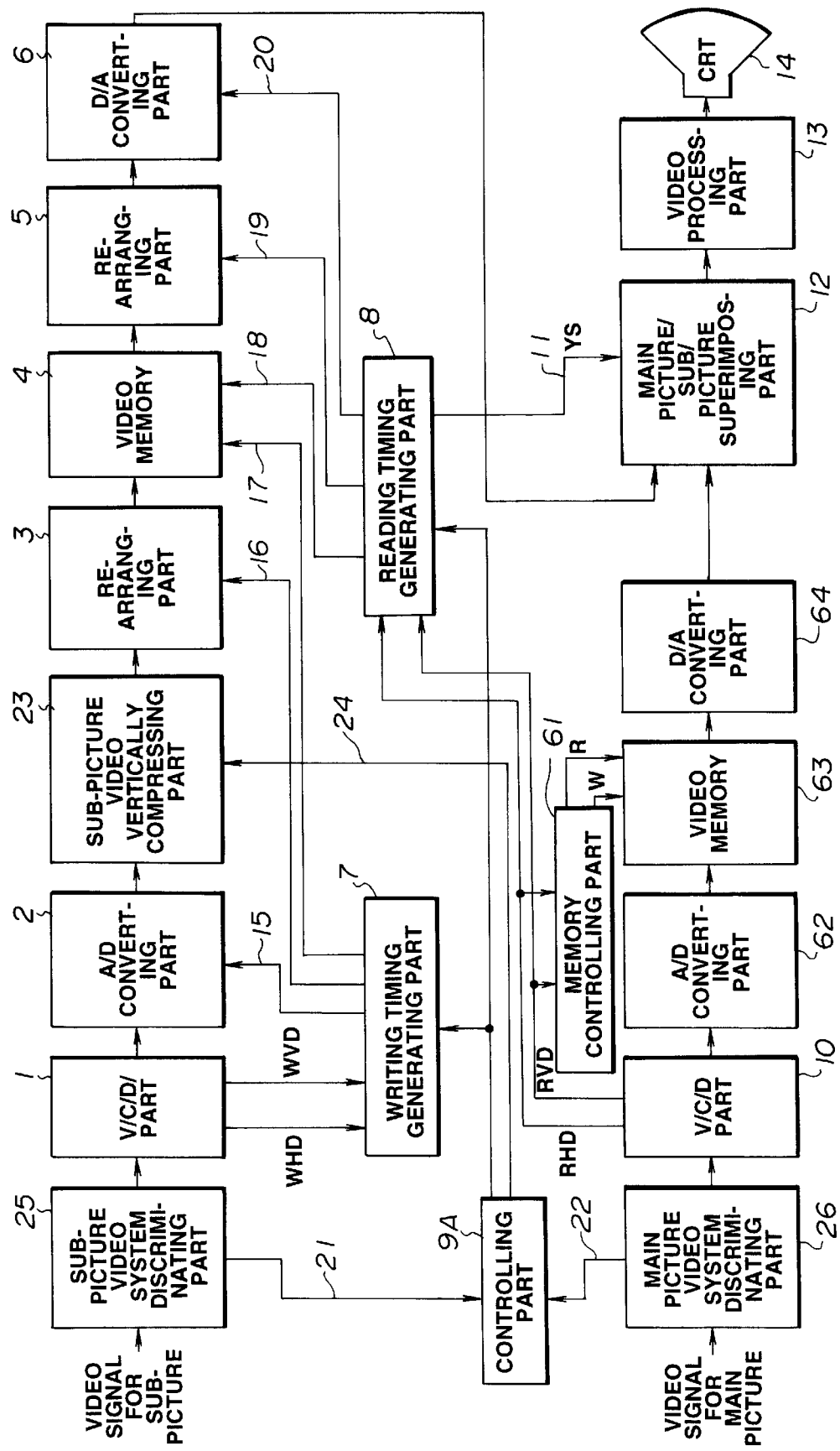
FIG. 1 is a block diagram showing the first embodiment of the multi-picture television receiver of the present invention wherein a function of applying a vertical compression to a sub-picture video signal is added.

FIG. 1 is a block diagram showing the first embodiment of the multi-picture television receiver of the present invention wherein a function of applying a vertical compression to the sub-picture video signal is added.

Figure 17:
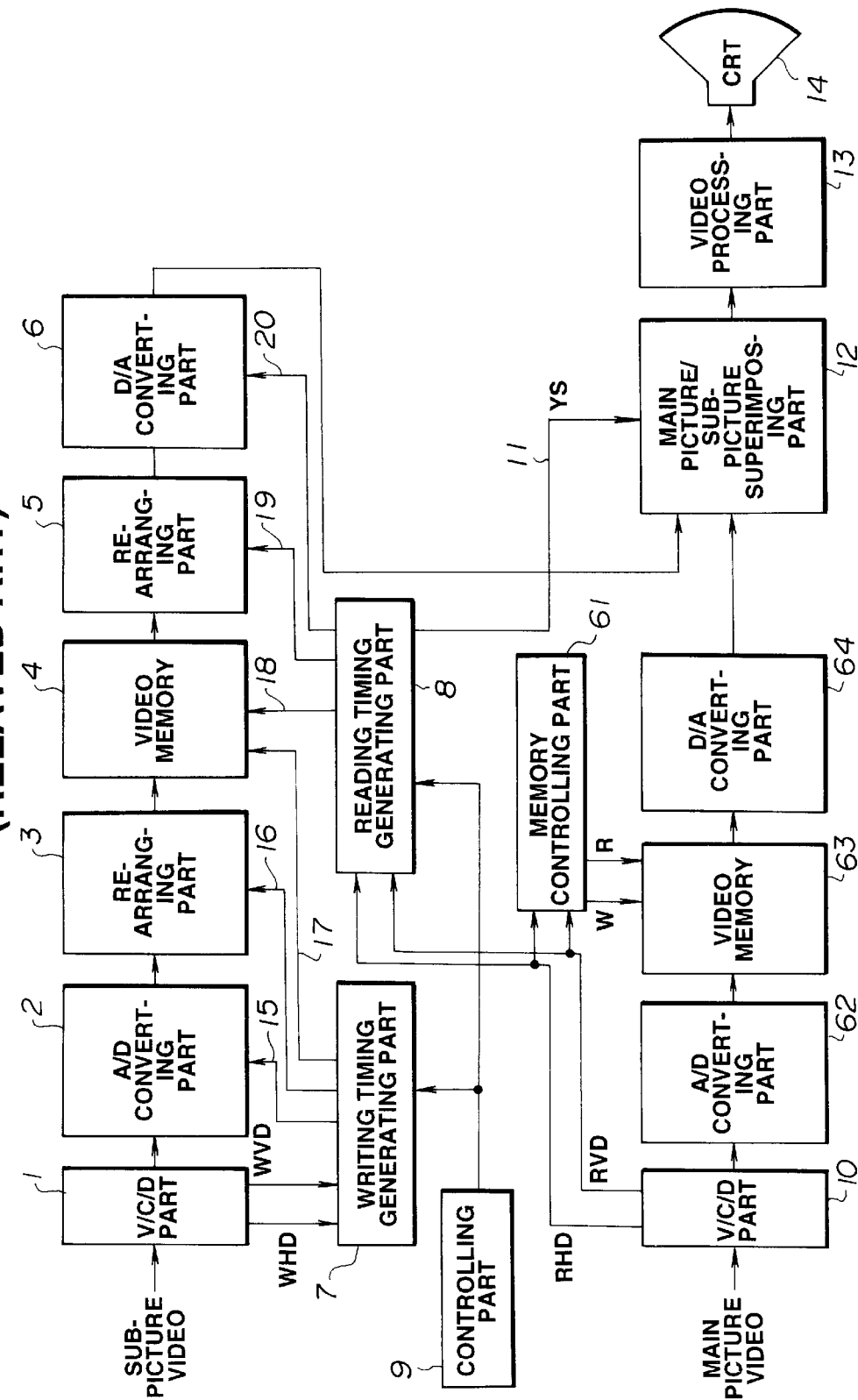
FIG. 17 is a block diagram showing a formation example of a conventional television receiver wherein two pictures of the same size are arranged, one of them is made a main picture and the other is made a sub-picture so as to be able to be displayed.

In FIG. 1, the same parts or functions as in the conventional television receiver (FIG. 17) shall bear the same reference numerals and shall not be explained here.

The sub-picture video signal as a second video signal is output to the main picture/sub-picture superimposing part 12 as a superimposing means through a sub-picture video system discriminating part 25, V/C/D part 1, A/D converting part 2, sub-picture video vertically compressing part 23, data re-arranging part (for writing into the memory) 3, video memory 4, data re-arranging part (for reading out of the memory) 5 and D/A converting part 6. The V/C/D part 1, A/D converting part 2, sub-picture video vertically compressing part 23, data re-arranging part (for writing into the memory) 3, video memory 4, data re-arranging part (for reading out of the memory) 5 and D/A converting part 6 form a sub-picture video processing means. The sub-picture video system discriminating part 25, which forms a second discriminating means, is to discriminate whether the system is a system of a high number of scanning lines or a system of a low number of scanning lines in case there are such broadcasting systems different in the number of scanning lines as, for example, the NTSC system and PAL system or the NTSC system and SECAM system. When the number of scanning lines of the sub-picture video signal is larger than the number of scanning lines of the main picture video signal, the sub-picture video vertically compressing part 23 will reduce, compress in the vertical direction and output the number of scanning lines of the sub-picture video signal. The writing timing generating part 7 which will adjust the timing of writing data into the video memory 4 and the reading timing generating part 8 which will adjust the timing of reading data out of the video memory 4 are controlled by a controlling part 9A to adjust said writing timing and reading timing on the basis of a controlling signal. The controlling part 9A controls also the sub-picture video vertically compressing part 23 as to whether the vertical compression is to be made or not. The sub-picture video data are read out of the video memory 4 at a speed about twice as high as in writing in and with a delay time (H/2) ½ the horizontal scanning period (1H). Thereby, the sub-picture video is displayed on the right half of the CRT.

On the other hand, the main picture video signal as a first video signal is output to the main picture/sub-picture superimposing part 12 as a superimposing means through a main picture video system discriminating part 26, V/C/D part 10, A/D converting part 62, video memory 63 and D/A converting part 64. The V/C/D part 10, A/D converting part 62, video memory 63 and D/A converting part 64 form a main picture video processing means. In case the input main picture video signal is of such broadcasting systems different in the number of scanning lines as, for example, the NTSC system and PAL system or the NTSC system and SECAM system, the main picture video system discriminating part 26, which forms a first discriminating means, will discriminate whether the system is a system of a large number of scanning lines or a system of a small number of scanning lines. The video memory 63 has the data writing and reading timing controlled by the memory controlling part 61. The same as with the sub-picture video data, the main picture video data are read out at a speed about twice as high as in writing into the video memory. Thereby, the main picture video is displayed on the left half of the CRT.

The superimposed video signal is reproduced to be a tri-color signal in the video processing part 13 and the tri-color signal is displayed on the picture of the CRT 14 as a displaying means.

Figure 2:
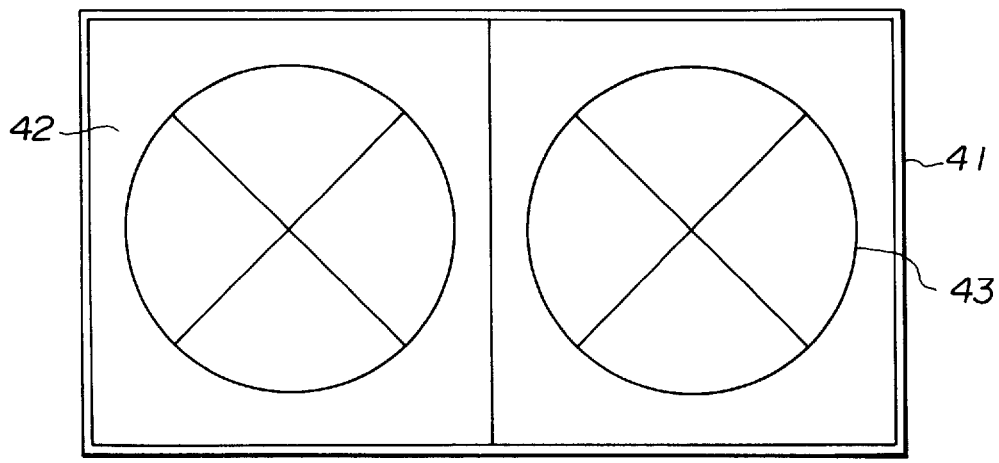
FIG. 2 is a view showing that, in case the number of scanning lines of a sub-picture displaying video is larger than the number of scanning lines of a main picture displaying video, the sub-picture displaying video will be vertically compressed and both main picture and sub-picture will be simultaneously displayed on the surface of a CRT.
Figure 3:
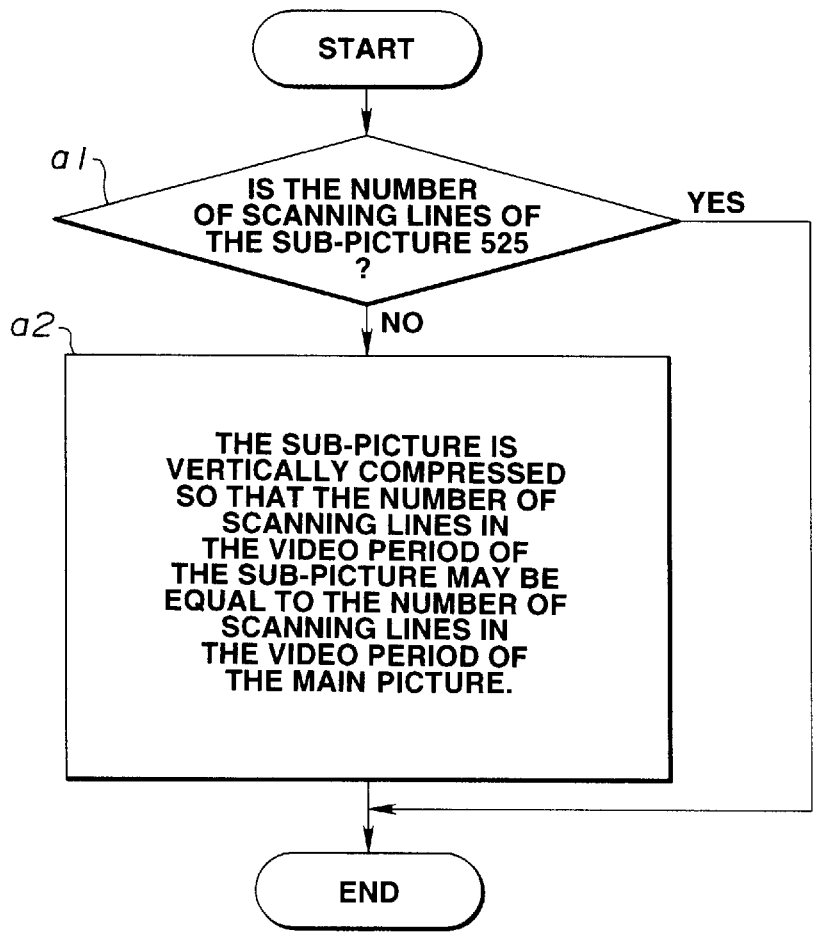
FIG. 3 is a view showing a procedure for producing the display in FIG. 2.

FIG. 2 is a view showing that the sub-picture displaying video will be vertically compressed and both main picture and sub-picture will be simultaneously displayed on the CRT surface in case the number of scanning lines of the sub-picture displaying video is larger than the number of scanning lines of the main picture displaying video. FIG. 3 is a view showing the procedure for producing the display in FIG. 2.

Displayed on the left side of the CRT surface 41 shown in FIG. 2 is the main picture video 42 and displayed on the right side is the sub-picture video 43. For the brevity of explanation, hereinafter, the same video shall be assumed to be displayed on the main picture and sub-picture.

As evident from FIG. 2, in this embodiment, the main picture video and sub-picture video are displayed the same. However, as the sub-picture video 43 is compressed in the number of scanning lines, as compared with the main picture video 42, some distortion is produced in the video. (This distortion depends on the vertically compressing method).

The operation of the multi-picture television receiver by said formation for such picture display shall be explained in the following. In this embodiment, the video displayed (input) in the main picture is assumed to be an NTSC signal.

The discriminating result of the sub-picture video system discriminating part 25 is fed as a discriminating result signal 21 to the controlling part 9A. The discriminating result of the main picture video system discriminating part 26 is fed as a discriminating result signal 22 to the controlling part 9A. According to FIG. 3, the controlling part 9A checks whether the number of scanning lines of the sub-picture is 525 lines, that is, the video signal input for the sub-picture is a video signal by the NTSC system the same as the main picture (step a1). If it is a video signal by the NTSC system, the controlling part 9A will be switched by the sub-picture video vertically compressing part controlling signal 24 to a state that the sub-picture video vertically compressing part 23 will not make a compressing operation and the sub-picture will be displayed as it is.

In said step a1, if the video signal input for the sub-picture is not an NTSC video signal, that is, produced, in case it is by a PAL system or a SECAM system, the controlling part 9A will control the sub-picture video vertically compressing part 23 by the sub-picture video vertically compressing part controlling signal 24 to make a compressing operation so that the number of scanning lines of the sub-picture video may be equal to the number of scanning lines of the main picture video (step a2). The number of scanning lines in the video displaying period of the sub-picture video equal to the number of scanning lines in the video displaying period of the main picture video is obtained by said operation. Thereby, the displayed picture shown in FIG. 2 is obtained.

Figure 4:
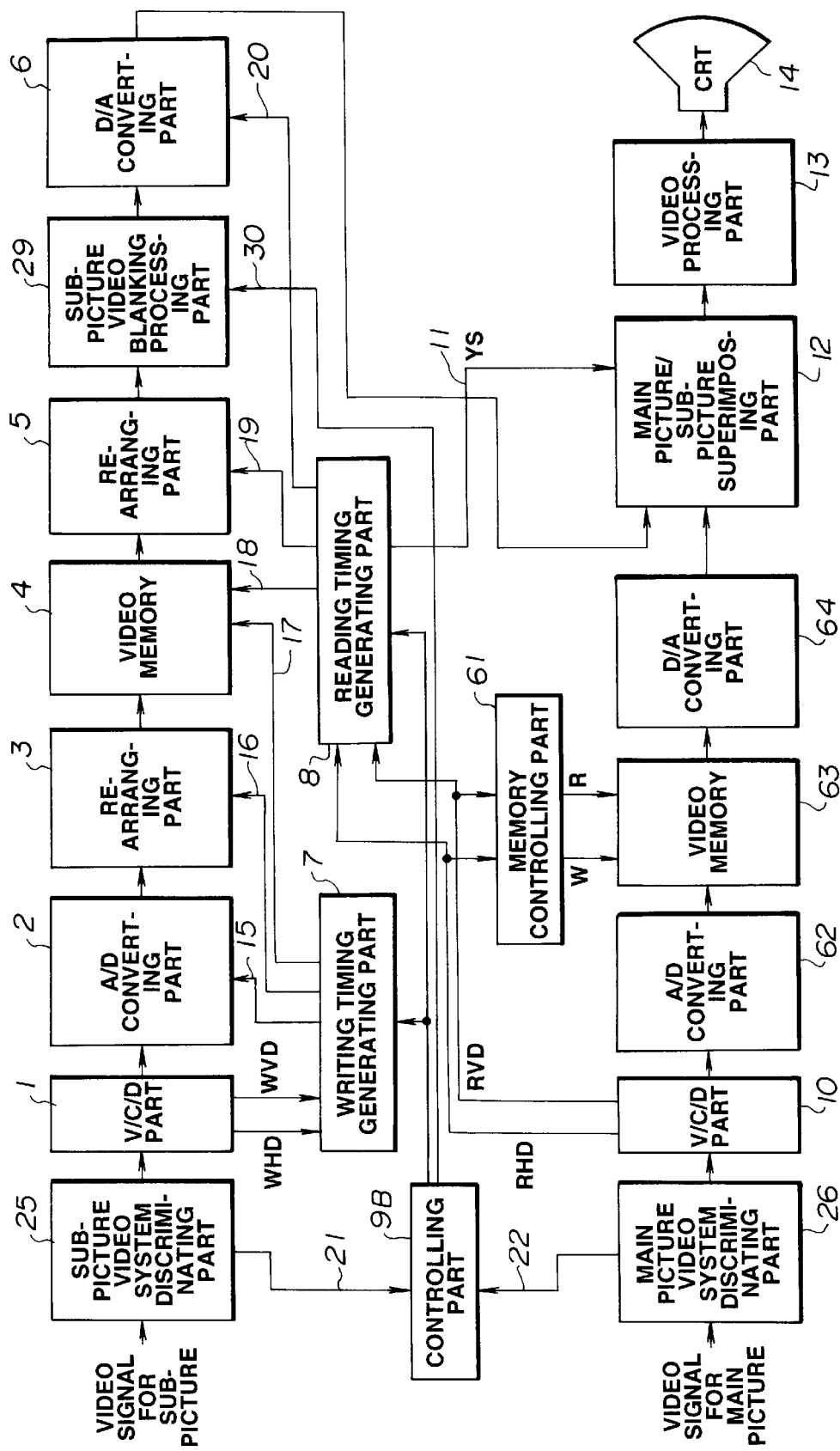
FIG. 4 is a block diagram showing the second embodiment of the multi-picture television receiver of the present invention wherein a function of applying a blanking process to the sub-picture video signal is added.

FIG. 4 is a block diagram showing the second embodiment of the multi-picture television receiver of the present invention wherein a function of applying a blanking process to the video signal for the sub-picture is added.

In FIG. 4, the sub-picture video signal as a second video signal is output to the main picture/sub-picture superimposing part 12 as a superimposing means through a sub-picture video system discriminating part 25, V/C/D part 1, A/D converting part 2, data re-arranging part (for writing into the memory) 3, video memory 4, data re-arranging part (for reading out of the memory) 5, sub-picture video blanking part 29 and D/A converting part 6. The V/C/D part 1, A/D converting part 2, data re-arranging part (for writing into the memory) 3, video memory 4, data re-arranging part (for reading out of the memory) 5, sub-picture video blanking part 29 and D/A converting part 6 form a sub-picture video processing means. In case the input sub-picture video signal is of such broadcasting systems different in the number of scanning lines as, for example, the NTSC system and PAL system or the NTSC system and SECAM system, the sub-picture video system discriminating part 25, which forms a second discriminating means, will discriminate whether it is of a system of a large number of scanning lines or a system of a small number of scanning lines. When the number of scanning lines of the sub-picture video signal is larger than the number of scanning lines of the main picture video signal, the sub-picture video blanking part 29 will blank at least one video signal part of the upper part and lower part of the sub-picture video signal and will reduce and output the number of scanning lines. The writing timing generating part 7 adjusting the timing of writing data into the video memory 4 and the reading timing generating part 8 adjusting the timing of reading data out of the video memory 4 are controlled by a controlling part 9B to adjust said writing timing and reading timing on the basis of a controlling signal. The controlling part 9B controls also the sub-picture video blanking part 29 as to whether the blanking process is to be made or not. The sub-picture video data read out of the video memory 4 are read out at a speed about twice as high as in writing in and with a delay time (H/2) ½ the horizontal scanning period (1H) so that the sub-picture video may be displayed on half the right side on the CRT.

On the other hand, the main picture video signal as a first video signal is output to the main picture/sub-picture superimposing part 12 through a main picture video system discriminating part 26, V/C/D part 10, A/D converting part 62, video memory 63 and D/A converting part 64. The V/C/D part 10, A/D converting part 62, video memory 63 and D/A converting part 64 form a main picture video processing means. In case the input main picture video signal is of such broadcasting systems different in the number of scanning lines as, for example, the NTSC system and PAL system or the NTSC system and SECAM system, the main picture video system discriminating part 26, which forms a first discriminating means, will discriminate whether the system is a system of a large number of scanning lines or a small number of scanning lines. Also, the video memory 63 is controlled by the memory controlling part 61 in the timing of writing and reading data. The same as the sub-picture video data, the main picture video data are read out at a speed about twice as high as in writing into the video memory 63 so that the main picture video may be displayed on half the left side on the CRT.

The superimposed video signal is reproduced to be a tri-color signal in the video processing part 13 and the tri-color signal is displayed on the picture of the CRT 14 as a displaying means.

Figure 5:
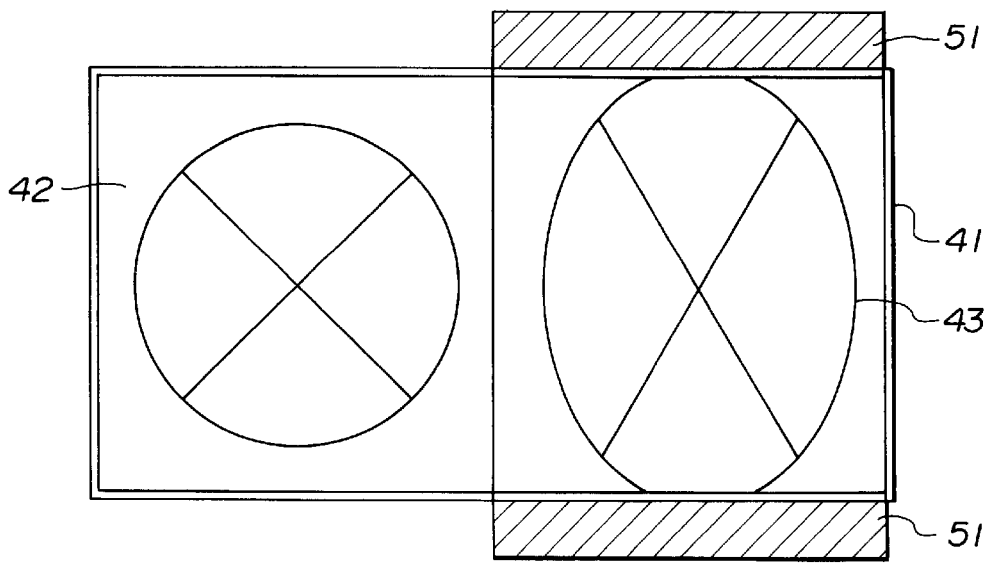
FIG. 5 is a view showing that, in case the number of scanning lines of the sub-picture displaying video is larger than the number of scanning lines of the main picture displaying video, the sub-picture displaying video will be blanked and both main picture and sub-picture will be simultaneously displayed on the CRT surface.
Figure 6:
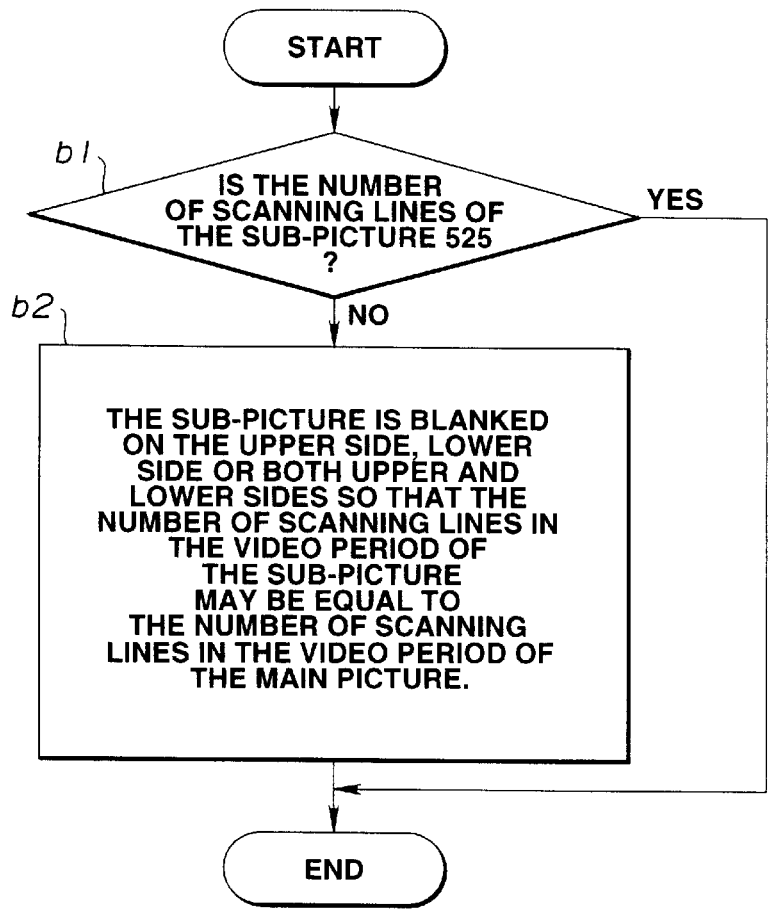
FIG. 6 is a view showing the procedure for producing the display in FIG. 5.

FIG. 5 is a view showing that, in case the number of scanning lines of the sub-picture displaying video is larger than the number of scanning lines of the main picture displaying video, the displaying video of the sub-picture will be blanked and both main picture and sub-picture will be simultaneously displayed on the CRT surface. FIG. 6 is a view showing the procedure for producing the display in FIG. 5.

Displayed on the left side of the CRT surface 41 shown in FIG. 5 is the main picture video 42 and displayed on the right side is the sub-picture video 43.

As evident from FIG. 5, in this embodiment, as compared with the main picture video 42, the sub-picture video 43 is displayed as somewhat extended. Above and below the sub-picture video displaying picture, though not directly visible, as the blanked sub-picture video 51, that is, the number of scanning lines of 525 is exceeded, there is a sub-picture video not displayed on the picture.

The operation of the multi-picture television receiver by said formation for such picture display shall be explained in the following. In this embodiment, the video produced by an NTSC system is displayed (input) on the main picture.

The discriminating result of the sub-picture video system discriminating part 25 is fed as a discriminating result signal 21 to the controlling part 9B and the discriminating result of the main picture video system discriminating part 26 is fed as a discriminating result signal 22 to the controlling part 9B. According to the flow chart in FIG. 6, the controlling part 9B checks whether the number of scanning lines of the sub-picture is 525, that is, whether the video signal input for the sub-picture is a video signal by the NTSC system the same as the main picture (step b1). If it is a video signal by the NTSC system, the controlling part 9B will switch the sub-picture video blanking part 29 by a sub-picture video blanking part controlling signal 30 not to make a blanking process and the sub-picture will be displayed as it is.

In said step b1, if the video signal input for the sub-picture is not a video signal by the NTSC system, that is, in case it is of the PAL system or SECAM system, the controlling part 9B will control the sub-picture video blanking part 29 by the sub-picture video blanking part controlling signal 30 to operate to make the effective number of scanning lines 525 by blanking the upper side and/or lower side of the sub-picture video signal so that the number of scanning lines of the sub-picture video may be equal to the number of scanning lines of the main picture video (step b2). By the above mentioned operation, the number of scanning lines in the video displaying period of the sub-picture video equal to the number of scanning lines in the video displaying period of the main picture video is obtained and thereby the displayed picture shown in FIG. 5 is obtained. Though the blanked sub-picture video 51 shown in FIG. 5 is not displayed on the picture, the blanking process is made in order to prevent this blanked sub-picture video 51 from giving bad influence to the normal displayed picture video in a vertical flyback time.

Figure 7:
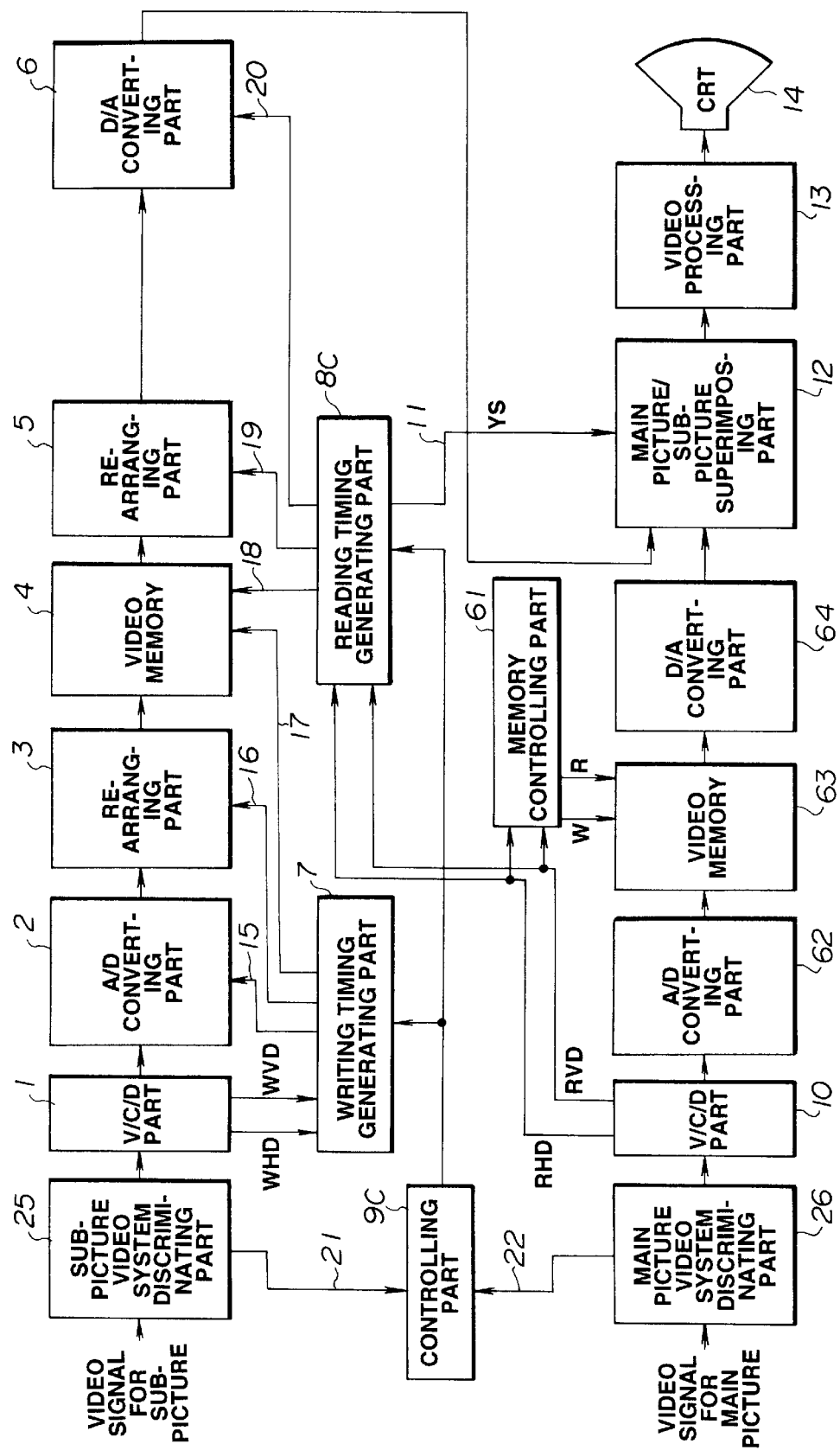
FIG. 7 is a block diagram showing the third embodiment of the multi-picture television receiver of the present invention wherein a function of not taking excess scanning lines out of scanning lines of the main picture displaying video is added.

FIG. 7 is a block diagram showing the third embodiment of the multi-picture television receiver of the present invention wherein a function of not taking excess scanning lines out of the sub-picture video signal is added.

In FIG. 7, the sub-picture video signal as a second video signal is output to the main picture/sub-picture superimposing part as a superimposing means 12 through a sub-picture video system discriminating part 25, V/C/D part 1, A/D converting part 2, data re-arranging part (for writing into the memory) 3, video memory 4, data re-arranging part (for reading out of the memory) 5 and D/A converting part 6. The V/C/D part 1, A/D converting part 2, data re-arranging part (for writing into the memory) 3, video memory 4, data re-arranging part (for reading out of the memory) 5 and D/A converting part 6 form a sub-picture video processing means. In case the input sub-picture video signal is of such broadcasting systems different in the number of scanning lines as, for example, the NTSC system and PAL system or the NTSC system and SECAM system, the sub-picture video system discriminating part 25, which forms a second discriminating means, will discriminate whether the system is a system of a large number of scanning lines or of a small number of scanning lines. The writing timing generating part 7 adjusting the timing of writing data into the video memory 4 and the reading timing generating part 8 adjusting the timing of reading data out of the video memory 4 are controlled by a controlling part 9C to adjust said writing timing and the reading timing on the basis of a controlling signal. By the way, the sub-picture video data read out of the video memory 4 are read out at a speed about twice as high as in writing in and with a delay time (H/2) ½ the horizontal scanning period (1H) so that the sub-picture video may be displayed on half the right side on the CRT.

On the other hand, the main picture video signal as a first video signal is output to the main picture/sub-picture superimposing part 12 as a superimposing means through a main picture video system discriminating part 26, V/C/D part 10, A/D converting part 62, video memory 63 and D/A converting part 64. The V/C/D part 10, A/D converting part 62, video memory 63 and D/A converting part 64 form a main picture video processing means. In case the input main picture video signal is of such broadcasting systems different in the number of scanning lines as, for example, the NTSC system and PAL system or the NTSC system and SECAM system, the main picture video system discriminating part 26, which forms a first discriminating means, will discriminate whether the system is a system of a large number of scanning lines or a system of a small number of scanning lines. The video memory 63 is controlled by the memory controlling part 61 in the data writing and reading timing. Note, the same as the sub-picture video data, the main picture video data are read out at a speed about twice as high as in writing into the video memory 63 and thereby the main picture video is displayed on half the left side on the CRT.

The superimposed video signal is reproduced to be a tri-color signal in the video processing part 13 and the tri-color signal is displayed on the picture of the CRT 14 as a displaying means.

Figure 8:
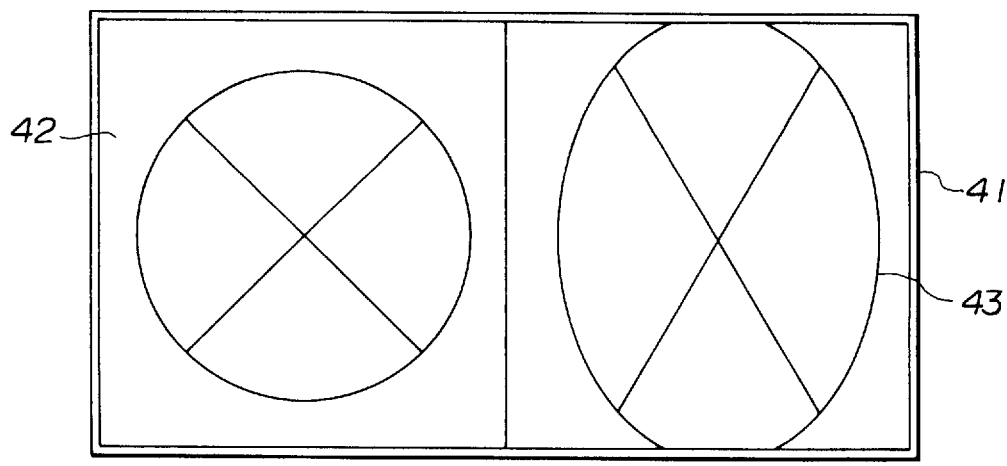
FIG. 8 is a view showing that, in case the number of scanning lines of the sub-picture displaying video is larger than the number of scanning lines of the main picture displaying video, excess scanning lines will not be taken out of the sub-picture displaying video and both main picture and sub-picture will be simultaneously displayed on the CRT surface.
Figure 9:
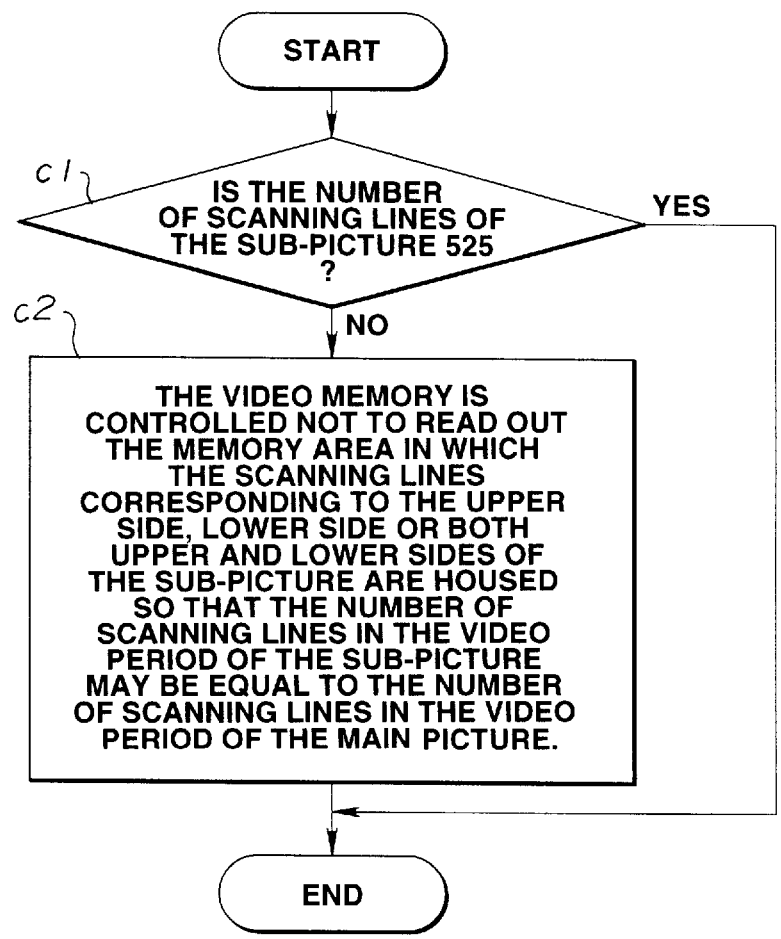
FIG. 9 is a view showing the procedure for producing the display in FIG. 8.

FIG. 8 is a view showing that, in case the number of scanning lines of the sub-picture displaying video is larger than the number of scanning lines of the main picture displaying video, excess scanning lines will not be taken out of the sub-picture video memorized in the video memory 4 and both main picture and sub-picture will be displayed simultaneously on the CRT surface. FIG. 9 is a view showing the procedure for producing the display in FIG. 8.

Displayed on the left side of the CRT surface 41 shown in FIG. 8 is the main picture video 42 and displayed on the right side is the sub-picture video 43.

As evident from FIG. 8, in this embodiment, as compared with the main picture video 42, the sub-picture video 43 is displayed as somewhat extended in the vertical direction.

The operation of the multi-picture television receiver by said formation for such picture display shall be explained in the following. Note, in this embodiment, the video by the NTSC system is displayed (input) on the main picture.

The discriminating result of the sub-picture video system discriminating part 25 is fed as a discriminating result signal 21 to the controlling part 9C. The discriminating result of the main picture video system discriminating part 26 is fed as a discriminating result signal 22 to the controlling part 9C. According to the flow chart in FIG. 9C, the controlling part 9C checks whether the number of scanning lines of the sub-picture is 525, that is, whether the video signal input for the sub-picture is a video signal by the NTSC system the same as the main picture (step c1). If it is a video signal by the NTSC system, the controlling part 9C will be switched through the reading timing generating part 8C to a mode of unconditionally reading out the information written into the video memory 4 and the sub-picture video will be displayed as it is.

If the video signal input for the sub-picture in said step cl is not a video signal by the NTSC system, that is, in case it is of the PAL system or SECAM system, the controlling part 9C will control by the data reading timing signal 18 generated by the reading timing generating part 8C through the reading timing generating part 8C so that the video memory 4 may not read out the specific region (address), that is, so that the number of scanning lines of the sub-picture video may be equal to the number of scanning lines of the main picture video and the memory region (address) in which the scanning lines corresponding to the upper side and/or lower side of the sub-picture video signal are housed may not be read out (step c2).

By said process, the number of scanning lines in the video displaying period of the sub-picture video equal to the number of scanning lines in the video displaying period of the main picture video is obtained and thereby the displaying picture shown in FIG. 8 is obtained.

Figure 10:
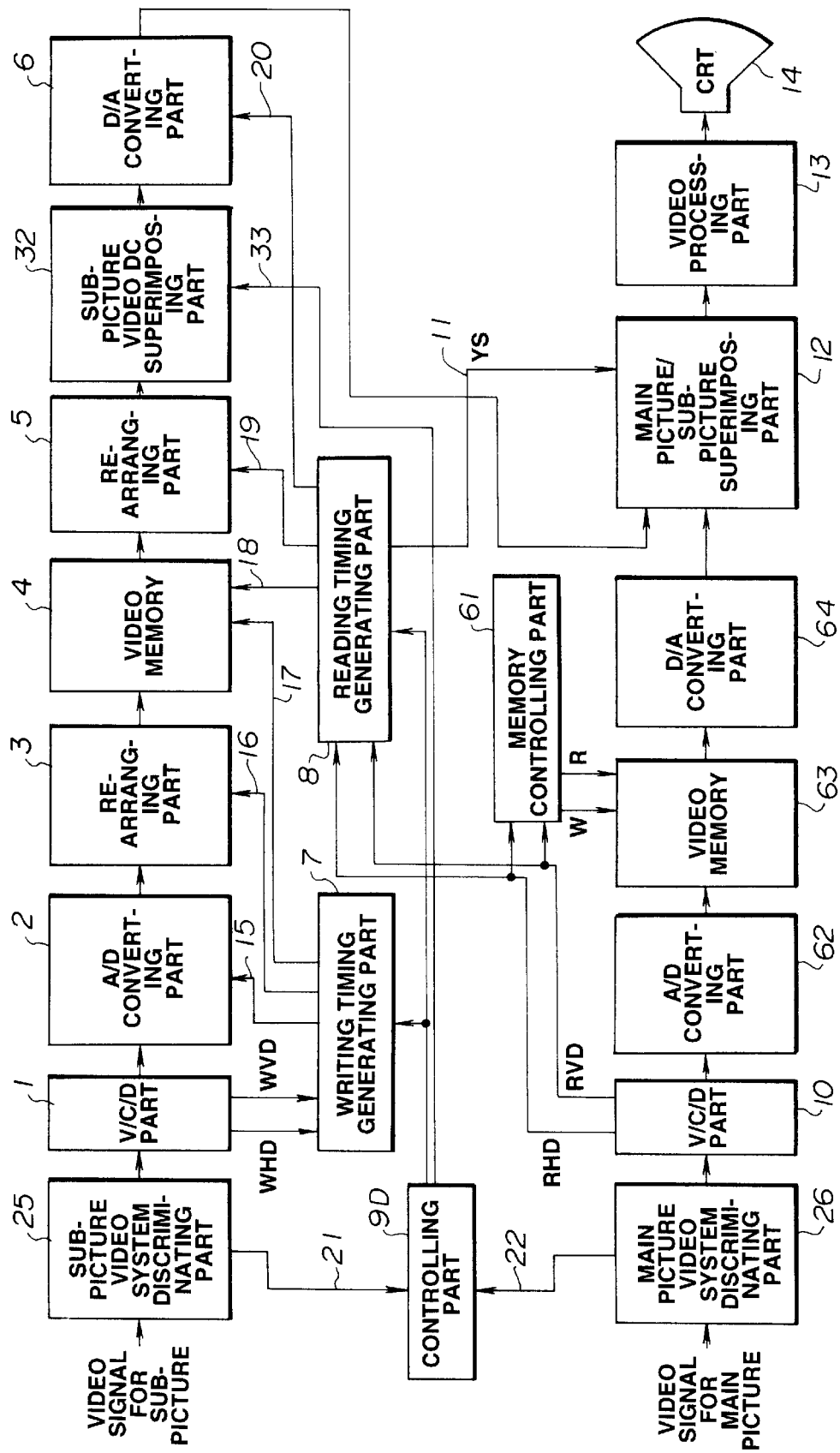
FIG. 10 is a block diagram showing the fourth embodiment of the multi-picture television receiver of the present invention wherein a function of applying the DC superimposing process to the sub-picture video signal is added.

FIG. 10 is a block diagram showing the fourth embodiment of the multi-picture television receiver of the present invention wherein a function of applying the DC superimposing process to the sub-picture video signal is added.

In FIG. 10, the sub-picture video signal as a second video signal is output to the main picture/sub-picture superimposing part 12 as a superimposing means through a sub-picture video system discriminating part 25, V/C/D part 1, A/D converting part 2, data re-arranging part (for writing into the memory) 3, video memory 4, data re-arranging part (for reading out of the memory) 5, sub-picture video DC (direct current) superimposing part 32 and D/A converting part 6. The V/C/D part 1, A/D converting part 2, data re-arranging part (for writing into the memory) 3, video memory 4, data re-arranging part (for reading out of the memory) 5, sub-picture video DC (direct current) superimposing part 32 and D/A converting part 6 form a sub-picture video processing means. In case the input sub-picture video signal is of such broadcasting systems different in the number of scanning lines as, for example, the NTSC system and PAL system or the NTSC system and SECAM system, the sub-picture video system discriminating part 25, which forms a second discriminating means, will discriminate whether the system is a system of a large number of scanning lines or a system of a small number of scanning lines. When the number of scanning lines of the sub-picture video signal is smaller than the number of scanning lines of the main picture video signal, the sub-picture video DC superimposing part 32 will add another video information to the sub-picture video signal and will increase and output the number of scanning lines. The added video information is a DC component giving a specific brightness or a DC component containing a color signal and luminance signal for giving color information by a specific brightness. The writing timing generating part 7 adjusting the timing of writing data into the video memory 4 and the reading timing generating part 8 adjusting the timing of reading data out of the video memory 4 are controlled by a controlling part 9D to adjust said writing timing and reading timing on the basis of a controlling signal. The controlling part 9D controls also the sub-picture DC (direct current) superimposing part 32 as to whether the DC superimposing process is to be made or not. By the way, the sub-picture video data read out of the video memory 4 are read out at a speed about twice as high as in writing in and with a delay time (H/2) ½ the horizontal scanning period (1H) so that the sub-picture video may be displayed on half the right side on the CRT.

On the other hand, the main picture video signal as a first video signal is output to the main picture/sub-picture superimposing part 12 as a superimposing means through a main picture video system discriminating part 26, V/C/D part 10, A/D converting part 62, video memory 63 and D/A converting part 64. The V/C/D part 10, A/D converting part 62, video memory 63 and D/A converting part 64 form a main picture video processing means. In case the input main picture video signal is of such broadcasting systems different in the number of scanning lines as, for example, the NTSC system and PAL system or the NTSC system and SECAM system, the main picture video system discriminating part 26, which forms a first discriminating means, will discriminate whether the system is a system of a large number of scanning lines or a system of a small number of scanning lines. Also, the video memory 63 has the data writing and reading timing controlled by the memory controlling part 61. Note, the same as the sub-picture video data, the main picture video data are read out at a speed about twice as high as in writing into the video memory 63 so that the main picture video may be displayed on half the left side on the CRT.

The superimposed video signal is reproduced in the video processing part 13 to be a tri-color signal and the tri-color signal is displayed on the picture of the CRT 14 as a displaying means.

Figure 11:
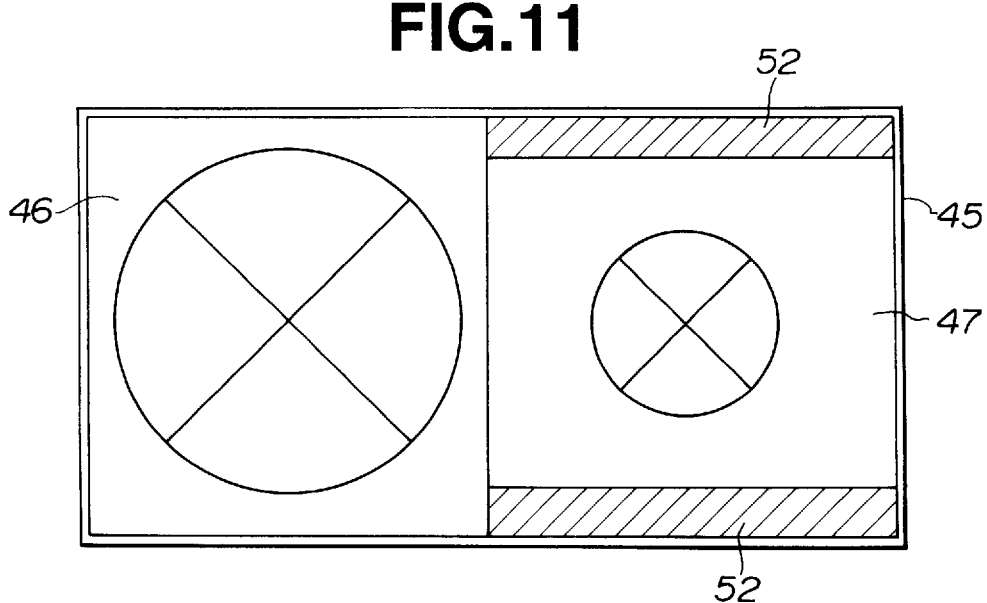
FIG. 11 is a view showing that, in case the number of scanning lines of the sub-picture displaying video is smaller than the number of scanning lines of the main picture displaying video, the sub-picture displaying video will be DC superimposed and both main picture and sub-picture will be simultaneously displayed on the CRT surface.
Figure 12:
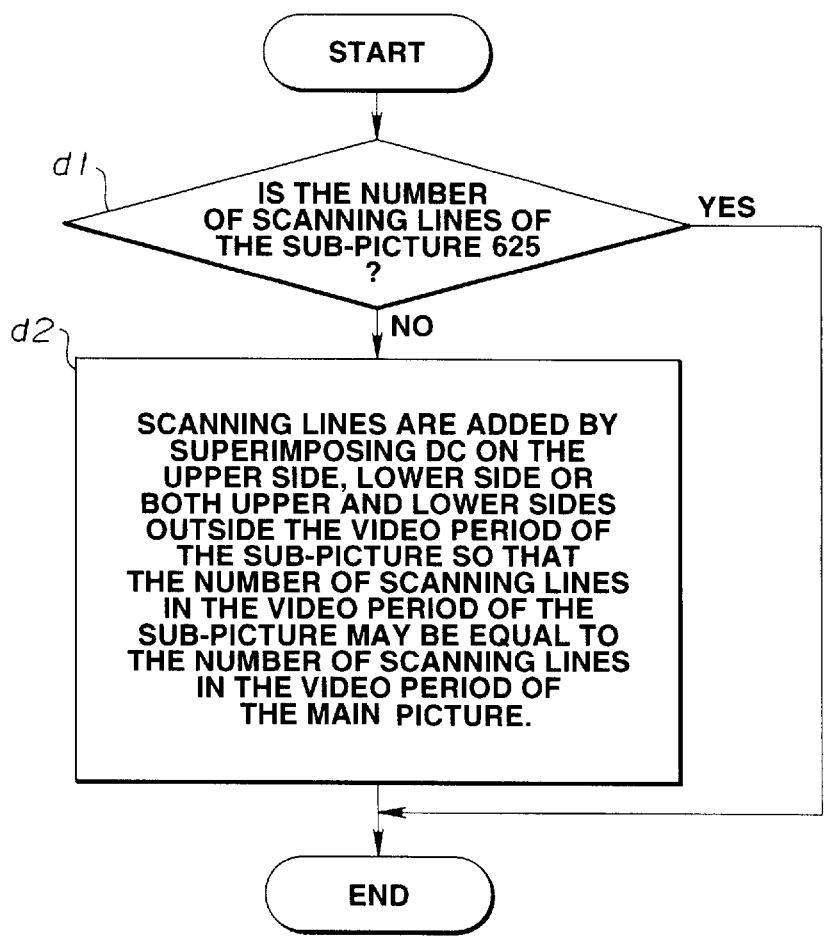
FIG. 12 is a view showing the procedure for producing the display in FIG. 11.

FIG. 11 is a view showing that, in case the number of scanning lines of the sub-picture displaying video is smaller than the number of scanning lines of the main picture displaying video, the sub-picture displaying video will be DC superimposed so that the both main picture and sub-picture may be simultaneously displayed on the CRT surface. FIG. 12 is a view showing the procedure for producing the display in FIG. 11.

Displayed on the left side of the CRT surface 45 shown in FIG. 11 is the main picture video 46 and displayed on the right side is the sub-picture video 47.

As evident from FIG. 11, in this embodiment, as compared with the main picture video 46, the sub-picture video 47 is shorter in the vertical length (due to the difference in the number of scanning lines) and therefore there are videoless parts 52 above and below.

The operation of the multi-picture television receiver by said formation for such picture display shall be explained in the following. Note, in this embodiment, it is assumed that a video by the PAL system is displayed (input) on the main picture.

The discriminating result of the sub-picture video system discriminating part 25 is fed as a discriminating signal 21 to the controlling part 9D and the discriminating result of the main picture video system discriminating part 26 is fed as a discriminating signal 22 to the controlling part 9D. According to the flow chart in FIG. 12, the controlling part 9D checks whether the number of scanning lines of the sub-picture is 625 lines, that is, whether the video signal input for the sub-picture is a video signal by the PAL system (or SECAM system) the same as the main picture (step d1). If it is a video signal by the PAL system (or SECAM system), the controlling part 9D will switch by the sub-picture video DC superimposing part controlling signal 33 to a state that the sub-picture video DC superimposing part 32 will not make a DC superimposing process. The sub-picture will be displayed as it is.

In said step d1, if the video signal input for the sub-picture is not a video signal by the PAL system (or SECAM system), that is, in case it is of the NTSC system, the controlling part 9D will control the sub-picture video DC superimposing part 32 by the sub-picture video DC superimposing part controlling signal 33 to add DC superimposed scanning lines to the upper side and/or lower side of the sub-picture video signal so that the number of scanning lines of the sub-picture video may be equal to the number of scanning lines of the main picture video (step d2). By said operation, the number of scanning lines in the video displaying period of the sub-picture video equal to the number of scanning lines in the video displaying period of the main picture video is obtained and thereby the displayed picture shown in FIG. 11 is obtained. Note, the videoless parts 52 shown in FIG. 11 can display any desired color with a desired luminance by the value of the superimposed DC.

Figure 13:
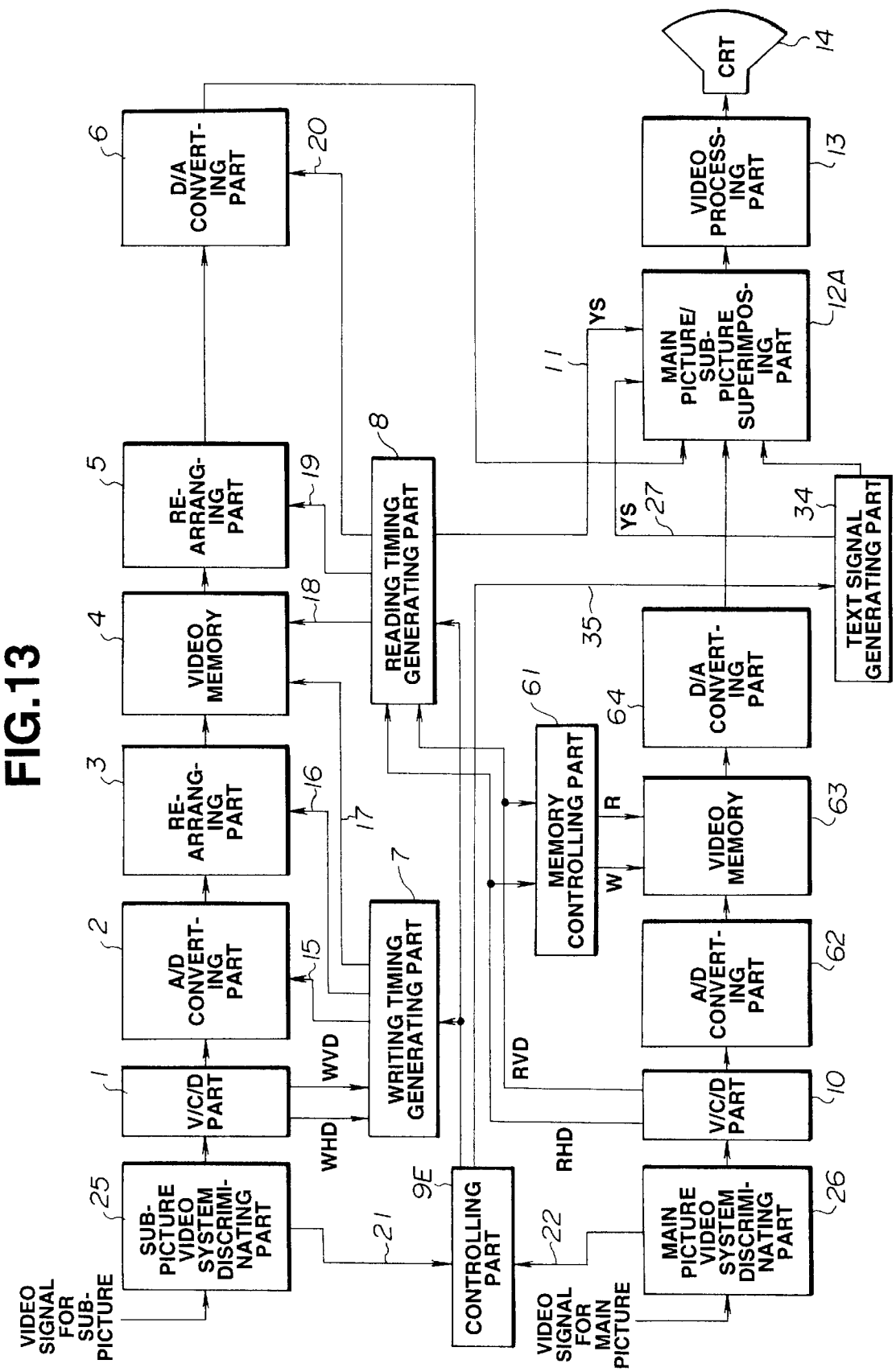
FIG. 13 is a block diagram showing the fifth embodiment of the multi-picture television receiver of the present invention wherein a text signal generating function is added to supplement a text signal having text data information to scanning lines lacking part of the sub-picture video signal.

FIG. 13 is a block diagram showing the fifth embodiment of the multi-picture television receiver of the present invention wherein a text signal generating function is added to supplement the scanning lines lacking part of the video signal for the sub-picture with a text signal having text data information.

In FIG. 13, the sub-picture video signal as a second video signal is output to a main picture/sub-picture superimposing part 12A as a superimposing means through a sub-picture video system discriminating part 25, V/C/D part 1, A/D converting part 2, data re-arranging part (for writing into the memory) 3, video memory 4, data re-arranging part (for reading out of the memory) 5 and D/A converting part 6. The V/C/D part 1, A/D converting part 2, data re-arranging part (for writing into the memory) 3, video memory 4, data re-arranging part (for reading out of the memory) 5 and D/A converting part 6 form a sub-picture video processing means. In case the input sub-picture video signal is of such broadcasting systems different in the number of scanning lines as, for example, the NTSC system and PAL system or the NTSC system and SECAM system, the sub-picture video system discriminating part 25, which forms a second discriminating means, will discriminate whether the system is a system of a large number of scanning lines or a system of a small number of scanning lines. The writing timing generating part 7 adjusting the timing of writing data into the video memory 4 and the reading timing generating part 8 adjusting the timing of reading data out of the video memory 4 are controlled by a controlling part 9E to adjust said writing timing and reading timing on the basis of a controlling signal. Also, the controlling part 9E controls the timing of outputting the text signal to the main picture/sub-picture superimposing part 12A by the text signal generating part 34. Note, the sub-picture video data read out of the video memory 4 are read out at a speed about twice as high as in writing in and with a delay time (H/2) ½ the horizontal scanning period (1H) so that the sub-picture video may be displayed on half the right side on the CRT. The text signal generating part 34, which forms a means generating text information, generates and feeds text data to the main picture/sub-picture superimposing part 12A and feeds the switching signal (YS) 27 for inserting said text data into at least one of the upper part and lower part of the sub-picture to the main picture/sub-picture superimposing part 12A. The main picture/sub-picture superimposing part 12A is provided with not only a function of selecting, switching and outputting in a horizontal direction the main picture video signal and sub-picture video signal compressed to be ½ in the horizontal direction but also a function of inserting the text signal into at least one of the parts corresponding to the upper side and lower side of the picture of the sub-picture video signal compressed to be ½ in the horizontal direction and outputting the sub-picture video signal containing the text signal.

On the other hand, the main picture video signal as a first video signal is output to the main picture/sub-picture superimposing part 12 as a superimposing means through a main picture video system discriminating part 26, V/C/D part 10, A/D converting part 62, video memory 63 and D/A converting part 64. The V/C/D part 10, A/D converting part 62, video memory 63 and D/A converting part 64 form a main picture video processing means. In case the input main picture video signal is of such broadcasting systems different in the number of scanning lines as, for example, the NTSC system and PAL system or the NTSC system and SECAM system, the main picture video system discriminating part 26, which forms a first discriminating means, will discriminate whether the system is a system of a large number of scanning lines or a system of a small number of scanning lines. The video memory 63 has the writing and reading timing controlled by the memory controlling part 61. Note, the same as the sub-picture video data, the main picture video data are read out at a speed about twice as high as in writing into the video memory 63 so that the main picture video may be displayed at a speed about twice as high as in writing into the video memory 63 so that the main picture video may be displayed on half the left side on the CRT.

The superimposed video signal is reproduced in the video processing part 13 to be a tri-color signal which is displayed on the picture of the CRT 14 as a displaying means.

Figure 14:
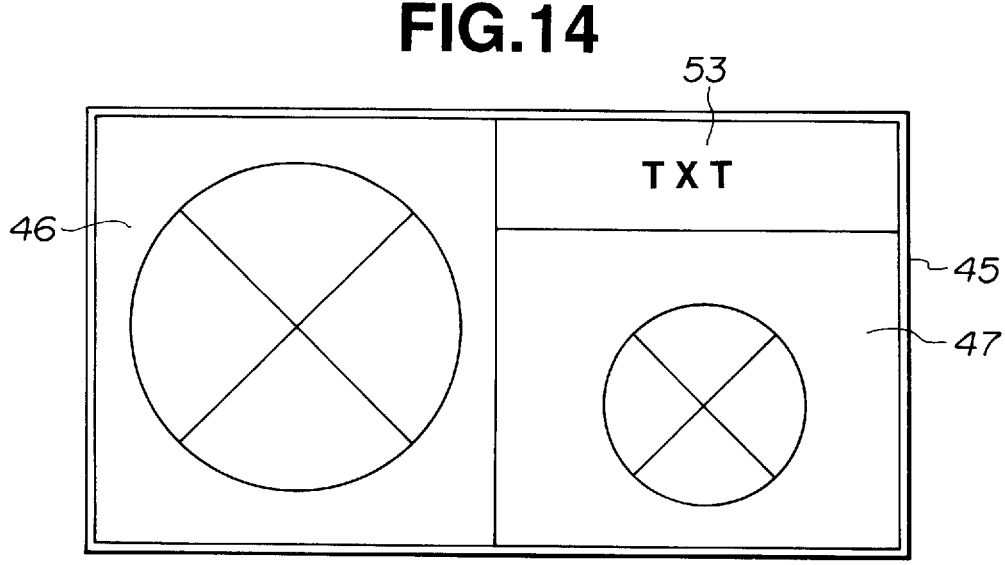
FIG. 14 is a view showing that, in case the number of scanning lines of the sub-picture displaying video is smaller than the number of scanning lines of the main picture displaying video, the sub-picture displaying video will have text data inserted in the blank part and will be displayed simultaneously on both main picture and sub-picture CRT surfaces.
Figure 15:
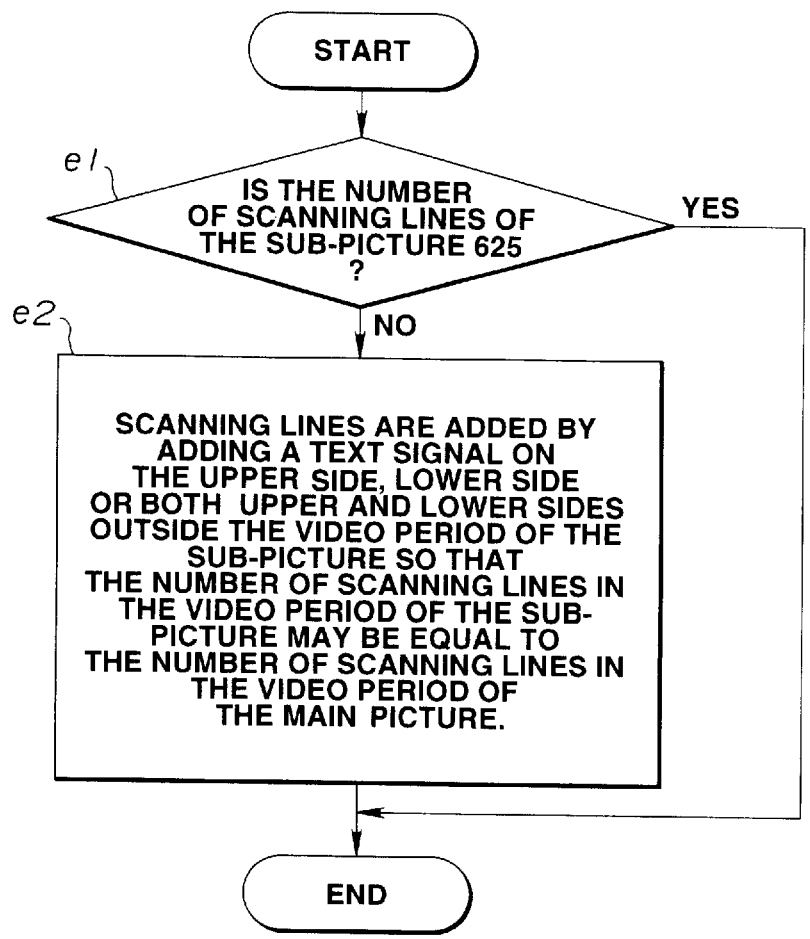
FIG. 15 is a view showing the procedure for producing the display in FIG. 14.

FIG. 14 is a view showing that, in case the number of scanning lines of the sub-picture displaying video is smaller than the number of scanning lines of the main picture displaying video, the text data will be inserted into the blank part of the displayed video of the sub-picture and both main picture and sub-picture will be simultaneously displayed on the CRT surface. FIG. 15 is a view showing the procedure for producing the display in FIG. 14.

Displayed on the left side of the CRT surface 45 shown in FIG. 14 is the main picture video 46 and displayed on the right side is the sub-picture video 47.

As evident from FIG. 14, in this embodiment, as compared with the main picture video 46, the sub-picture video 47 is shorter in the vertical length (due to the difference in the number of scanning lines) and therefore a videoless part is produced on the upper side. Therefore, the videoless part is filled with the text picture 53 based on the text signal generated by the text signal generating part 34.

The operation of the multi-picture television receiver by said formation for such picture display shall be explained in the following. Note, in this embodiment, it is assumed that the video by the PAL system is displayed (input) on the main picture.

The discriminating result of the sub-picture video system discriminating part 25 is fed as a discriminating result signal 21 to the controlling part 9E and the discriminating result of the main picture video system discriminating part 26 is fed as a discriminating result signal 22 to the controlling part 9E. According to the flow chart in FIG. 15, the controlling part 9E checks whether the number of scanning lines of the sub-picture is 625 lines, that is, whether the video signal input for the sub-picture is a video signal by the PAL system (or SECAM system) the same as the main picture (step e1). If it is a video signal by the PAL system (or SECAM system), the controlling part 9E will display the sub-picture as it is.

In said step e1, if the video signal input for the sub-picture is not a video signal by the PAL system (or SECAM system), that is, in case it is of the NTSC system, the controlling part 9E will control the text signal generating part 34. At this time, the controlling part 9E will control the text signal generating part 34 with the controlling signal 35 to add the text signal generated in the text signal generating part 34 to the upper side and/or lower side outside the video period of the sub-picture so that the sum of the the number of scanning lines based on the text signal and the number of scanning lines in the displaying period of the sub-picture may be equal to the number of scanning lines in the video period of the main picture and will control so that the number of scanning lines of the sub-picture video may be equal to the number of scanning lines of the main picture video. The text data are added to the sub-picture signal by using the switching signal 27 in the main picture/sub-picture superimposing part 12A (step e2).

By said operation, the number of scanning lines in the video displaying period of the sub-picture video equal to the number of scanning lines in the video displaying period of the main picture video is obtained. Thereby, the displayed pictures shown in FIG. 14 are obtained.

Figure 16:
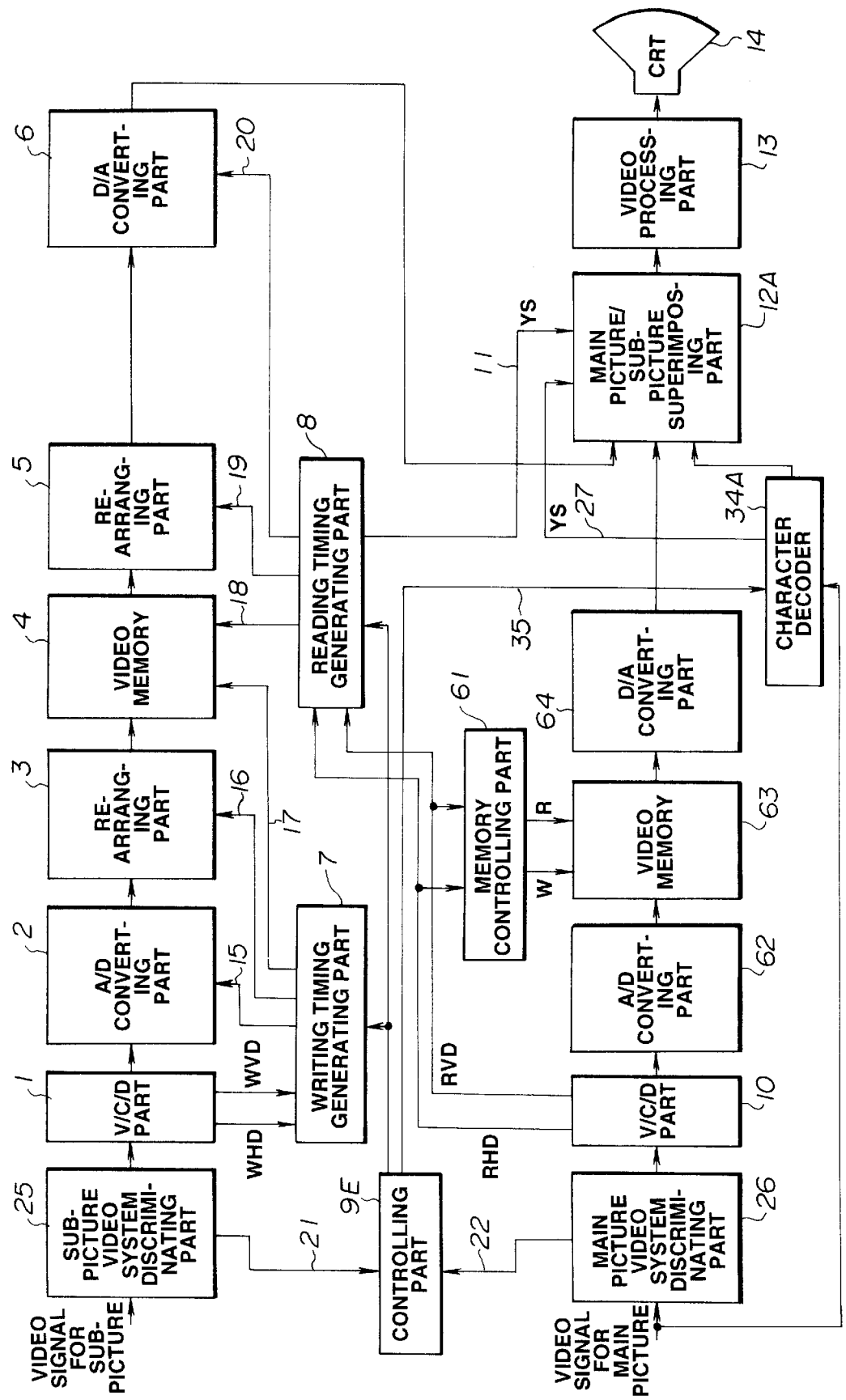
FIG. 16 is a block diagram showing the sixth embodiment of the multi-picture television receiver of the present invention wherein a character broadcast decoder or character screen broadcast decoder is added so that the sub-picture video signal may have a text signal having text data information supplemented to the number of scanning lines lacking part.

FIG. 16 is a block diagram showing the sixth embodiment of the multi-picture television receiver of the present invention wherein a character broadcast or character screen broadcast decoder is added to supplement the number of scanning lines of the sub-picture video signal lacking part with a text signal having text data information.

The embodiment shown in FIG. 16 is of a formation wherein said text signal generating part 34 in the embodiment in FIG. 13 is replaced with a character decoder 34A for character broadcasts or character screen broadcasts. The character decoder 34A for character broadcasts or character screen broadcasts is to decode a text signal of a character broadcast or character screen broadcast superimposed in a main picture video signal and output it to the main picture/sub-picture superimposing part 12A. By such formation, a text signal of a character broadcast or character screen broadcast can be displayed on the text picture 53 shown in FIG. 14. By the way, when a video signal to be fed to the character decoder 34A is made a sub-picture video signal instead of said main picture video signal, the text signal of a character broadcast or character screen broadcast superimposed in the sub-picture video signal will be able to be displayed.

As explained above, in said embodiment, the television systems to be received are only three kinds of the NTSC system, PAL system and SECAM system and the television system to be received on the main picture has been explained as limited to the NTSC system or PAL system. However, the present invention is not limited to it and can be applied also to another television system.

As described above, according to the present invention, in the television receiver having a main picture and sub-picture displayed as divided into two parts, videos by such television systems different in the number of scanning lines as, for example, the PAL and NTSC can be simultaneously displayed and viewed.

By the way, the present invention is not limited to only the above described embodiments but can be variously modified and worked in the range not deviating from the subject matter of the invention.

What is claimed is:

1. A multi-picture television receiver wherein a main picture by a first video signal of a first video system and a sub-picture by a second video signal of a second video system can be displayed simultaneously on the left and right sides of a display, the receiver comprising:

(A) main picture video processing means whereby said first video signal can be input, compressed in a horizontal direction and be output;

(B) sub-picture video processing means including a first means compressing said second video signal in a horizontal direction and a second means whereby said second video signal can have the number of scanning lines reduced and can be compressed in a vertical direction;

(C) first discriminating means discriminating the first video system of said first video signal;

(D) second discriminating means discriminating the second video system of said second video signal;

(E) controlling means controlling said sub-picture video processing means on the basis of the discriminating results of said first and said second discriminating means so that,
when the number of scanning lines of said second video signal is larger than the number of scanning lines of said first video signal, said second video signal will be compressed in a vertical direction and,
when the number of scanning lines of said second video signal and the number of scanning lines of said first video signal are equal to each other, said second video signal will not be compressed in the vertical direction and will be output; and (F) superimposing means whereby the output signal of said main picture video processing means and the output signal of said sub-picture video processing means are input and the respective output signals are selected, switched and fed to a displaying means.

2. A multi-picture television receiver wherein a main picture by a first video signal of a first video system and a sub-picture by a second video signal of a second video system can be displayed simultaneously on the left and right sides of a display, the receiver comprising:

(A) main picture video processing means whereby said first video signal can be input, compressed in a horizontal direction and be output;

(B) sub-picture video processing means including a first means compressing said second video signal in a horizontal direction and a second means whereby the video part in at least one of an upper part and lower part of said second video signal can be blanked, have the number of scanning lines reduced and be output;

(C) first discriminating means discriminating the system of said first video signal;

(D) second discriminating means discriminating the system of said second video signal;

(E) controlling means controlling said sub-picture video processing means on the basis of the discriminating results of said first and second discriminating means so that, when the number of scanning lines of said second video signal is larger than the number of scanning lines of said first video signal, said second video signal will be blanked, will have the scanning lines reduced and will be output and, when the number of scanning lines of said second video signal and the number of scanning lines of said first video signal are equal to each other, said second video signal will not be blanked, will not have the scanning lines reduced and will be output; and (F) superimposing means whereby the output signal of said main picture video processing means and the output signal of said sub-picture video processing means are input and the respective output signals are selected, switched and fed to a displaying means.

3. A multi-picture television receiver wherein a main picture by a first video signal of a first video system and a sub-picture by a second video signal of a second video system can be displayed simultaneously on the left and right sides of a display, the receiver comprising:

(A) main picture video processing means whereby said first video signal can be input, compressed in a horizontal direction and be output;

(B) sub-picture video processing means whereby said second video signal can be converted to a digital signal, the digital signal can be written into a provided memory and the signal written into said memory can be read out, converted to an analog signal and be output;

(C) first discriminating means discriminating the system of said first video signal;

(D) second discriminating means discriminating the system of said second video signal;

(E) controlling means controlling said sub-picture video processing means on the basis of the discriminating results of said first and second discriminating means so that, when the number of scanning lines of said second video signal is larger than the number of scanning lines of said first video signal, other than the video signal part corresponding to at least one of the upper part and lower part of the picture of the second video signal written into said memory will be read out and the number of scanning lines of the sub-picture will be controlled to be equal to the number of scanning lines of the main picture and, when the number of scanning lines of said second video signal is equal to the number of scanning lines of said first video signal, all the video signal parts of the second video signal written into said memory will be controlled to be read out; and (F) superimposing means whereby the output signal of said main picture video processing means and the output signal of said sub-picture video processing means are input and the respective output signals are selected, switched and fed to a displaying means.

4. A multi-picture television receiver wherein a main picture by a first video signal of a first video system and a sub-picture by a second video signal of a second video system can be displayed simultaneously on the left and right sides of a display, the receiver comprising:

(A) main picture video processing means whereby said first video signal can be input, compressed in a horizontal direction and be output;

(B) sub-picture video processing means including a first means compressing said second video signal in a horizontal direction and a second means whereby said second video signal can have another video signal added to increase the number of scanning lines and can be output;

(C) first discriminating means discriminating the system of said first video signal;

(D) second discriminating means discriminating the system of said second video signal;

(E) controlling means controlling said sub-picture video processing means on the basis of the discriminating results of said first and second discriminating means so that, when the number of scanning lines of said second video signal is smaller than the number of scanning lines of said first video signal, said second video signal will have another video information added to increase the number of scanning lines and will be output and, when the number of scanning lines of said second video signal is equal to the number of scanning lines of said first video signal, said second video signal will not have said another video information added and will be output; and (F) superimposing means whereby the output signal of said main picture video processing means and the output signal of said sub-picture video processing means are input and the respective output signals are selected, switched and fed to a displaying means.

5. A multi-picture television receiver according to claim 4 wherein said added another video information is a DC component to give a specific brightness video.

6. A multi-picture television receiver according to claim 4 wherein said added another video information is a DC component including a color signal and luminance signal to give a color video by a specific brightness.

7. A multi-picture television receiver wherein a main picture by a first video signal of a first video system and a sub-picture by a second video signal of a second video system can be displayed simultaneously on the left and right sides of a display, the receiver comprising:

(A) main picture video processing means whereby said first video signal can be input, compressed in a horizontal direction and be output;

(B) sub-picture video processing means including a first means compressing said second video signal in a horizontal direction and a second means whereby said second video signal can have another video information added to increase the number of scanning lines and can be output;

(C) means generating text information;

(D) first discriminating means discriminating the system of said first video signal;

(E) second discriminating means discriminating the system of said second video signal;

(F) controlling means controlling said sub-picture video processing means on the basis of the discriminating results of said first and second discriminating means so that, when the number of scanning lines of said second video signal is smaller than the number of scanning lines of said first video signal, said second video signal will have said text information added to increase the number of scanning lines and will be output and, when the number of scanning lines of said second video signal is equal to the number of scanning lines of said first video signal, said second video signal will not have said text information added and will be output; and (G) superimposing means whereby the output signal of said main picture video processing means and the output signal of said sub-picture video processing means are input and the respective output signals are selected, switched and fed to a displaying means.

8. A multi-picture television receiver according to claim 7 wherein said means generating text information is a decoder decoding a character broadcast signal or character screen broadcast signal superimposed on said first or second video signal.

9. A multi-picture television receiver wherein a main picture by a first video signal of a first video system and a sub-picture by a second video signal of a second video system can be displayed simultaneously on the left and right sides of a display, the receiver comprising:

(A) main picture video processing circuitry constructed and adapted whereby said first video signal can be input, compressed in a horizontal direction and be output;

(B) sub-picture video processing circuitry including first circuitry constructed and adapted to compress said second video signal in a horizontal direction and a second circuitry constructed and adapted whereby said second video signal can have the number of scanning lines reduced and can be compressed in a vertical direction;

(C) first discriminating circuitry constructed and adapted to discriminate said first video signal system;

(D) second discriminating circuitry constructed and adapted to discriminate said second video signal system;

(E) controlling circuitry constructed and adapted to control said sub-picture video processing circuitry on the basis of the discriminating results of said first and second discriminating circuitry so that, when the number of scanning lines of said second video signal is larger than he number of scanning lines of said first video signal, said second video signal will be compressed in a vertical direction and, when the number of scanning lines of said second video signal and the number of scanning lines of said first video signal are equal to each other, said second video signal will not be compressed in the vertical direction and will be output; and (F) superimposing circuitry constructed and adapted whereby the output signal of said main picture video processing circuitry and the output signal of said sub-picture video processing circuitry are input and the respective output signals are selected, switched and fed to a display circuitry.

10. A multi-picture television receiver wherein a main picture by a first video signal of a first video system and a sub-picture by a second video signal of a second video system can be displayed simultaneously on the left and right sides of a display, the receiver comprising:

(A) main picture video processing circuitry constructed and adapted whereby said first video signal can be input, compressed in a horizontal direction and be output;

(B) sub-picture video processing circuitry including a first circuitry constructed and adapted to compress said second video signal in a horizontal direction and second circuitry constructed and adapted whereby the video part in at least one of an upper part and lower part of said second video signal can be blanked, have the number of scanning lines reduced and be output;

(C) first discriminating circuitry constructed and adapted to discriminate the system of said first video signal;

(D) second discriminating circuitry constructed and adapted to discriminate the system of said second video signal;

(E) controlling circuitry constructed and adapted to control said sub-picture video processing circuitry on the basis of the discriminating results of said first and second discriminating circuitry so that, when the number of scanning lines of said second video signal is larger than the number of scanning lines of said first video signal, said second video signal will be blanked, will have the scanning lines reduced and will be output and, when the number of scanning lines of said second video signal and the number of scanning lines of said first video signal are equal to each other, said second video signal will not be blanked, will not have the scanning lines reduced and will be output; and (F) superimposing circuitry constructed and adapted whereby the output signal of said main picture video processing circuitry and the output signal of said sub-picture video processing circuitry are input and the respective output signals are selected, switched and fed to displaying circuitry.

11. A multi-picture television receiver wherein a main picture by a first video signal of a first video system and a sub-picture by a second video signal of a second video system can be displayed simultaneously on the left and right sides of a display, the receiver comprising:

(A) main picture video processing circuitry constructed and adapted whereby said first video signal can be input, be compressed in a horizontal direction and be output;

(B) sub-picture video processing circuitry constructed and adapted whereby said second video signal can be converted to a digital signal, the digital signal can be written into a provided memory and the signal written into said memory can be read out, can be converted to an analog signal and can be output;

(C) first discriminating circuitry constructed and adapted to discriminate the system of said first video signal;

(D) second discriminate circuitry constructed and adapted to discriminate the system of said second video signal;

(E) controlling circuitry constructed and adapted to control said sub-picture video processing circuitry on the basis of the discriminating results of said first and second discriminating circuitry so that, when the number of scanning lines of said second video signal is larger than the number of scanning lines of said first video signal, others than the video signal part corresponding to at least one of the upper part and lower part of the picture of the second video signal written into said memory will be read out and the number of scanning lines of the sub-picture will be controlled to be equal to the number of scanning lines of the main picture and, when the number of scanning lines of said second video signal is equal to the number of scanning lines of said first video signal, all the video signal parts of the second video signal written into said memory will be controlled to be read out; and (F) superimposing circuitry constructed and adapted whereby the output signal of said main picture video processing circuitry and the output signal of said sub-picture video processing circuitry are input and the respective output signals are selected, switched and fed to displaying circuitry.

12. A multi-picture television receiver wherein a main picture by a first video signal of a first video system and a sub-picture by a second video signal of a second video system can be displayed simultaneously on the left and right sides of a display, the receiver comprising:

(A) main picture video processing circuitry constructed and adapted whereby said first video signal can be input, compressed in a horizontal direction and be output;

(B) sub-picture video processing circuitry including a first circuitry constructed and adapted to compress said second video signal in a horizontal direction and a second circuitry constructed and adapted whereby said second video signal can have another video signal added to increase the number of scanning lines and can be output;

(C) first discriminating circuitry constructed and adapted to discriminate the system of said first video signal;

(D) second discriminating circuitry constructed and adapted to discriminate the system of said second video signal;

(E) controlling circuitry constructed and adapted to control said sub-picture video processing circuitry on the basis of the discriminating results of said first and second discriminating circuitry so that, when the number of scanning lines of said second video signal is smaller than the number of scanning lines of said first video signal, said second video signal will have another video information added to increase the number of scanning lines and will be output and, when the number of scanning lines of said second video signal is equal to the number of scanning lines of said first video signal, said second video signal will not have said another video information added and will be output; and (F) superimposing circuitry constructed and adapted whereby the output signal of said main picture video processing circuitry and the output signal of said sub-picture video processing circuitry are input and the respective output signals are selected, switched and fed to displaying circuitry.

13. A multi-picture television receiver according to claim 12 wherein said added another video information is a DC component to give a specific brightness video.

14. A multi-picture television receiver according to claim 12 wherein said added another video information is a DC component including a color signal and luminance signal to give a color video by a specific brightness.

15. A multi-picture television receiver wherein a main picture by a first video signal of a first video system and a sub-picture by a second video signal of a second video system can be displayed simultaneously on the left and right sides of a display, the receiver comprising:

(A) main picture video processing circuitry constructed and adapted whereby said first video signal can be input, compressed in a horizontal direction and be output;

(B) sub-picture video processing circuitry including a first circuitry constructed and adapted to compress said second video signal in a horizontal direction and a second circuitry constructed and adapted whereby said second video signal can have another video information added to increase the number of scanning lines and can be output;

(C) circuitry constructed and adapted to generate text information;

(D) first discriminating circuitry constructed and adapted to discriminate the system of said first video signal;

(E) second discriminating circuitry constructed and adapted to discriminate the system of said second video signal;

(F) controlling circuitry constructed and adapted to control said sub-picture video processing circuitry on the basis of the discriminating results of said first and second discriminating circuitry so that, when the number of scanning lines of said second video signal is smaller than the number of scanning lines of said first video signal, said second video signal will have said text information added to increase the number of scanning lines and will be output and, when the number of scanning lines of said second video signal is equal to the number of scanning lines of said first video signal, said second video signal will not have said text information added and will be output; and (G) superimposing circuitry constructed and adapted whereby the output signal of said main picture video processing circuitry and the output signal of said sub-picture video processing circuitry are input and the respective output signals are selected, switched and fed to displaying circuitry.

16. A multi-picture television receiver according to claim 15 wherein said circuitry generating text information is a decoder decoding a character broadcast signal or character screen broadcast signal superimposed on said first or said second video signal.

17. A receiver as in any one of claims 1–16 wherein said first video system is selected from the group comprising PAL, SECAM and NTSC, and wherein said second video system is selected from the group comprising PAL, SECAM and NTSC.

* * * * *